US012574516B2

(12) United States Patent
Zhang et al.

(10) Patent No.: US 12,574,516 B2
(45) Date of Patent: Mar. 10, 2026

(54) METHODS AND APPARATUS TO ENCODE AND DECODE VIDEO USING QUANTIZATION MATRICES

(71) Applicant: Intel Corporation, Santa Clara, CA (US)

(72) Inventors: Ximin Zhang, San Jose, CA (US); Zhijun Lei, Portland, OR (US); Jill Boyce, Portland, OR (US); Sang-Hee Lee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 842 days.

(21) Appl. No.: 17/555,092

(22) Filed: Dec. 17, 2021

(65) Prior Publication Data

US 2022/0109840 A1     Apr. 7, 2022

(51) Int. Cl.
| | |
|---|---|
| *H04N 19/126* | (2014.01) |
| *H04N 19/119* | (2014.01) |
| *H04N 19/136* | (2014.01) |
| *H04N 19/172* | (2014.01) |
| *H04N 19/18* | (2014.01) |

(Continued)

(52) U.S. Cl.
CPC ......... *H04N 19/126* (2014.11); *H04N 19/119* (2014.11); *H04N 19/136* (2014.11); *H04N 19/172* (2014.11); *H04N 19/18* (2014.11); *H04N 19/423* (2014.11); *H04N 19/70* (2014.11)

(58) Field of Classification Search
CPC .. H04N 19/119; H04N 19/126; H04N 19/136; H04N 19/18
See application file for complete search history.

(56) References Cited

U.S. PATENT DOCUMENTS

| | | |
|---|---|---|
| 7,373,009 B2 | 5/2008 | Winger |
| 10,218,977 B2 | 2/2019 | Zhang et al. |

(Continued)

OTHER PUBLICATIONS

International Searching Authority, "International Search Report and Written Opinion," issued in connection with International Appl. No. PCT/US2022/049286, mailed Mar. 22, 2023, 12 pages.

(Continued)

*Primary Examiner* — Zhubing Ren
(74) *Attorney, Agent, or Firm* — Hanley, Flight & Zimmerman, LLC

(57) ABSTRACT

Methods, apparatus, systems, and articles of manufacture are disclosed to encode and decode video using quantization matrices. An example apparatus includes interface circuitry to access an input frame of video, quantization matrix syntax encoder circuitry to encode a set of user-defined quantization matrices into a sequence header associated with a sequence of video frames including the input frame, adaptive quantization matrix selector circuitry to select a subset of quantization matrices from a combination of a set of default quantization matrices and the set of user-defined quantization matrices, adaptive segment selector circuitry to select a first one of the subset of quantization matrices for a first segment of the input frame, the input frame to be divided into a plurality of segments including the first segment, and encoder circuitry to quantize transform coefficients of the first segment of the input frame based on the first one of the subset of quantization matrices.

25 Claims, 13 Drawing Sheets

(51) Int. Cl.
      *H04N 19/423*      (2014.01)
      *H04N 19/70*       (2014.01)

(56)          References Cited

U.S. PATENT DOCUMENTS

| | | | |
|---|---|---|---|
| 2010/0080287 A1* | 4/2010 | Ali | H04N 21/44209 |
| | | | 375/240.03 |
| 2012/0243604 A1* | 9/2012 | Lu | H04N 19/186 |
| | | | 375/240.03 |
| 2013/0216149 A1* | 8/2013 | Sato | H04N 19/82 |
| | | | 382/248 |
| 2015/0381983 A1* | 12/2015 | Oh | H04N 19/70 |
| | | | 375/240.03 |
| 2021/0235087 A1* | 7/2021 | Yoshikawa | H04N 19/126 |
| 2022/0109840 A1 | 4/2022 | Zhang et al. | |
| 2022/0321885 A1* | 10/2022 | Lim | H04N 19/18 |

OTHER PUBLICATIONS

International Searching Authority, "International Preliminary Report on Patentability," issued in connection with International Patent Application No. PCT/US2022/049286, issued on Jun. 13, 2024, 8 pages.

Alliance for Open Media, "AV1 Video Codec," downloaded on Jan. 22, 2025, available at https://aomedia.org/specifications/av1/, 2 pages.

\* cited by examiner

METHODS AND APPARATUS TO ENCODE AND DECODE VIDEO USING QUANTIZATION MATRICES

FIELD OF THE DISCLOSURE

This disclosure relates generally to video coding and, more particularly, to methods and apparatus to encode and decode video using quantization matrices.

BACKGROUND

In recent years, increased demand for media has increased the amount of video files shared over networks. Similarly, as camera and graphics technologies improve, video file sizes have increased. To support and facilitate the transfer of large video files over a network, video coding techniques to reduce the sizes of video files are used throughout industry. A video coding techniques typically includes both an encode and decode procedure. A source machine may execute an encode procedure to compress an input video into a smaller file, which may be shared over a network to a destination machine. The destination machine may execute a decode procedure to reconstruct the input video from the smaller file.

BRIEF DESCRIPTION OF THE DRAWINGS

In general, the same reference numbers will be used throughout the drawing(s) and accompanying written description to refer to the same or like parts. The figures are not to scale.

Figure 1:
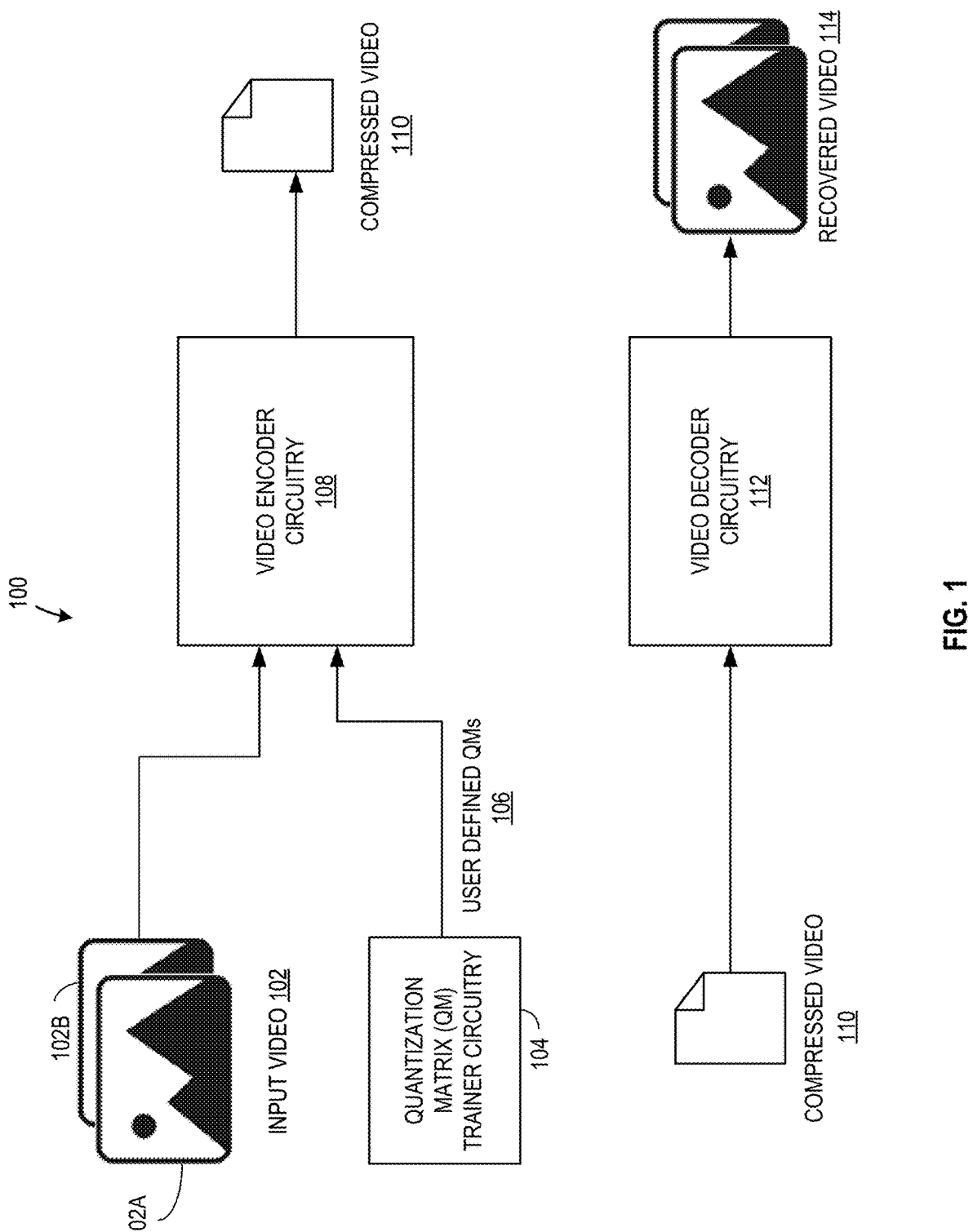
FIG. 1 is an example system to encode and decode video using quantization matrices.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

In recent years, many video coding techniques have supported video file transfer with direct cosine transform (DCT) matrices. A DCT matrix divides an input video frame into segments and describes the frequency components of each segment. In examples disclosed herein, frequency may refer to the rate at which pixel values change within the input video frame. In general, the human visual system is more sensitive to low frequencies, where pixel values change relatively slowly, than high frequencies, where pixel values change relatively quickly.

Video coding techniques that utilize a DCT matrix may additionally use a quantization matrix (QM) to leverage the sensitivity of the human visual system. A QM is a matrix of coefficients that describes the relative importance of frequency components within an associated DCT matrix. A video coding technique may specify that a DCT matrix is divided element wise by its associated QM to produce an output matrix. In some examples, an output matrix may be referred to as a transform block. In some examples, producing an output matrix may be referred to as quantizing the transform coefficients of the DCT matrix.

Generally, QMs are designed so that high frequency components in the DCT matrix are reduced or eliminated in the resulting output matrix. By encoding the output matrix rather than the original DCT matrix, video coding techniques can remove data that the human visual system is less perceptive of and reduce file size. In some examples, the amount of data saved in the reduced file size may be referred to as a compression range.

Some prior video coding techniques may support user-defined QMs, which in turn may be used to achieve larger compression ranges than are available using default QMs. However, such prior video coding techniques explicitly encode a QM for each frame, which reduces the flexibility of the video coding technique in some encoding conditions.

Other prior video coding techniques may not explicitly encode a QM for each frame. Rather, such prior video coding techniques may define a number of default QMs and encode a matrix index for each frame, where the matrix index describes which default QM should be used when decoding the frame. Those prior video coding techniques may exhibit increased flexibility in some encoding conditions but do not support user-defined QMs.

Furthermore, some prior video coding techniques assign a single QM to an entire frame. As a result, some segments of the decoded frame may retain a higher quality relative to the original frame than other segments. For example, if a frame consists of sharp texts and a complex background, it may be difficult to use a single QM to avoid text blurring and achieve a high quality background.

Examples disclosed herein may be used to form a video coding technique that supports user-defined QMs, does not explicitly encode a QM for each frame, and supports the use of multiple QMs within a single frame. For example, on the encoding side, example video encoder circuitry 108, which is disclosed in detail below, includes example QM syntax encoder circuitry 202, which is disclosed in detail below, to encode a set of user-defined QMs into a sequence header associated with an input video frame. Example adaptive QM selector circuitry 206, which is disclosed in detail below, selects a subset of QMs used for the input video frame. The subset of QMs come from a larger set of both default QMs and user-defined QMs. Example adaptive segment selector circuitry 208, which is disclosed in detail below, assigns a QM from the subset for each segment within the input video frame. Example encoder circuitry 210, which is disclosed in detail below, quantizes the DCT coefficients of each segment using the assigned QMs.

On the decoding side, example video decoder circuitry 112, which is disclosed in detail below, includes example sequence decoder circuitry 302, which is disclosed in detail below, to determine syntax information for a sequence within the compressed video. In the beginning of decoding each frame, example frame decoder circuitry 304, which is disclosed in detail below, derives the QMs for the current frame. Example segment decoder circuitry 306, which is disclosed in detail below, then assigns one QM to each segment. Example dequantizer circuitry 308, which is disclosed in detail below, the dequantizes transform blocks within each segment using the assigned QMs.

FIG. 1 is an example system 100 to encode and decode video using quantization matrices. The example system 100 includes example input video 102, example QM trainer circuitry 104, example user-defined QMs 106, example video encoder circuitry 108, example compressed video 110, example video decoder circuitry 112, and example recovered video 114.

The input video 102 of FIG. 1 is a video to be compressed. The input video 102 may be of any length and describe any content. Furthermore, the input video 102 may be compressed for any reason. In some examples, the input video 102 is compressed before transmission over a network. The input video 102 includes a first frame 102A and a second frame 102B. While FIG. 1 illustrates two frames for simplicity, the input video 102 may include any number of frames.

The QM trainer circuitry 104 of FIG. 1 implements a training algorithm to derive a set of user-defined QMs 106. The training algorithm may be of any type, including one or more of a rules-based heuristic, Artificial Intelligence, Machine Learning, Deep Learning algorithm, etc. In some examples, the example QM trainer circuitry 104 derives a set of user-defined QMs 106 corresponding to different video characteristics. For example, the training algorithm may derive the set of user-defined QMs 106 to include both a first frame optimized to compress an image with low complexity (such as, for example, a loading screen), and a second frame optimized to compress an image with high complexity (such as, for example, a computer generated action scene).

A user may provide training data and/or other training parameters to specify the contents of the derived user-defined QMs 106. A QM contains coefficients that describe how various frequency components of frames in the input video 102 are compressed. A user may specify contents of the user-defined QMs 106 for any reason. In some examples, the user-defined QMs 106 are used to achieve higher compression range than are possible with default QMs. The user-defined QMs 106 may include QMs for various conditions within an input video 102.

In some examples, the QM trainer circuitry 104 implements the training algorithm to create user-defined QMs 106 each time an instance of input video 102 is to be compressed. However, in some examples, the QM trainer circuitry 104 may not implement the training algorithm to create user-defined QMs 106 each time an instance of the input video 102 needs compression. Instead, in such examples, the example QM trainer circuitry 104 may implement the training algorithm before any input video 102 instance is compressed so that the same set of user-defined QMs 106 is utilized across compressions. In some examples, the example QM trainer circuitry 104 may rerun the training algorithm to add, remove, or generally edit the user-defined QMs 106. The example QM trainer circuitry 104 may edit the user-defined QMs 106 based on input from a user. Additionally or alternatively, the user may manually edit the user-defined QMs 106.

The example video encoder circuitry 108 of FIG. 1 compresses the input video 102 to produce a compressed video 110. The compressed video 110 describes the input video 102 but has a smaller file size. The example video encoder circuitry 108 supports user-defined QMs 106, does not explicitly encode a QM for each frame, and supports the use of multiple QMs within a single frame. An example implementation of the video encoder circuitry 108 is illustrated in FIG. 2, which is described in detail below.

Figure 3:
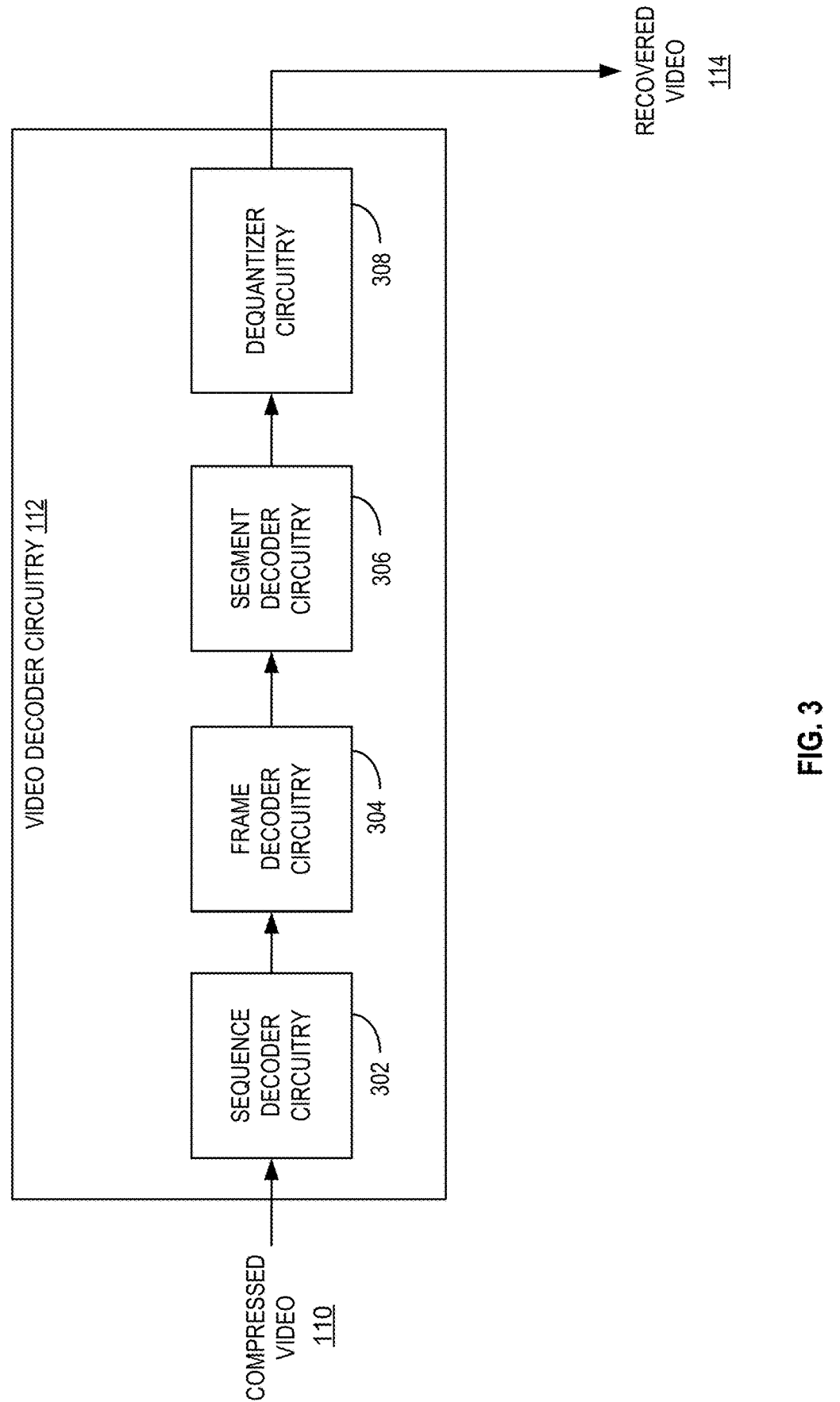
FIG. 3 is a block diagram of an example implementation of the example video decoder circuitry of FIG. 1.

The example video decoder circuitry 112 of FIG. 1 decompresses the compressed video 110 to produce a recovered video 114. The recovered video 114 is a replication of the input video 102. In some examples, data from the recovered video 114 is an exact replica of data from the input video 102 rather than an approximation of data from the input video 102. In some such examples, the type of compression performed by the example video encoder circuitry 108 may be referred to as lossless data compression. In other examples, the data from the recovered the video 114 is an approximation of data from the input video 102 rather than an exact replica. In some such examples, the type of compression performed by the example video encoder circuitry 108 may be referred to as lossy data compression. An example implementation of the video decoder circuitry 112 is illustrated in FIG. 3, which is described in detail below.

The example system 100 compresses a video to a smaller size for storage and/or transfer over a network and decompresses the video for use after storage and/or transmission. Because the example video encoder circuitry 108 supports user-defined QMs 106, does not explicitly encode a QM for each frame, and supports the use of multiple QMs within a single frame, the example system 100 can offer improved granularity, flexibility, and efficiency over prior video coding techniques.

Figure 2:
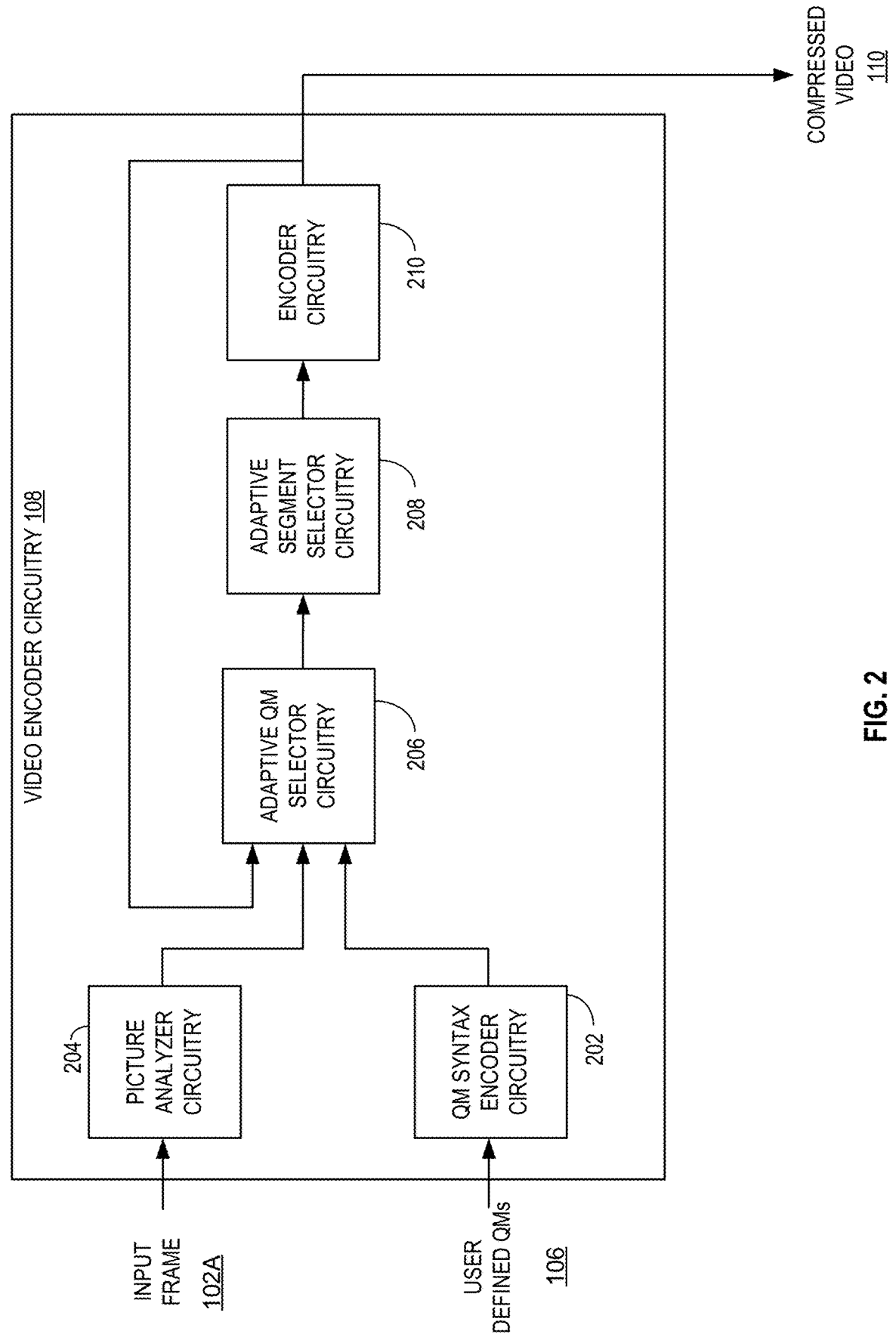
FIG. 2 is a block diagram of an example implementation of the example video encoder circuitry of FIG. 1.

FIG. 2 is a block diagram of an example implementation of the video encoder circuitry 108 of FIG. 1. The example video encoder circuitry 108 of FIG. 2 may be instantiated (e.g., creating an instance of, bring into being for any length of time, materialize, implement, etc.) by processor circuitry such as a central processing unit executing instructions. Additionally or alternatively, the example video encoder circuitry 108 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example video encoder circuitry 108 includes example QM syntax encoder circuitry 202, example picture analyzer circuitry 204, example adaptive QM selector circuitry 206, example adaptive segment selector circuitry 208, and example encoder circuitry 210. The example QM syntax encoder circuitry 202 of FIG. 2 accepts the user-defined QMs 106 selected by a user and encodes the user-defined QMs 106 into a sequence header. In some examples, a sequence header is a data structure that contains encoding and display parameters for one or more Groups Of Pictures (GOPs). A GOP is a data structure that contains a collection of sequential pictures within the video. In some examples, a picture may also be referred to as a frame 102A.

The example picture analyzer circuitry 204 of FIG. 2 analyzes spatial features of a frame 102A. A spatial feature is data that describes characteristics of various portions of the frame 102A and/or objects within the frame 102A. For example, spatial features may identify vectors, lines, polygons, regions, etc. within the frame 102A. The example picture analyzer circuitry 204 may use any technique to analyze spatial features. These techniques include but are not limited to one or more of a rules based heuristic, Artificial Intelligence, Machine Learning, Deep Learning algorithm, etc.

The example picture analyzer 204 determines bitrate and quality control information for a frame 102A. The bitrate and quality control information of a given frame 102A influences how the frame 102A is compressed to achieve a desired quality. In some examples, the example picture analyzer 20 uses spatial analysis to determine bitrate and quality control information. The example picture analyzer circuitry 204 may use any technique to determine bitrate and quality control information, including but not limited to the one or more techniques to analyze spatial features of the frame 102A.

In some examples, the example picture analyzer circuitry 204 determines the number and location of segments within the frame. A segment refers to a collection of pixels within the frame. Any collection of pixels within a frame may collectively form a segment. In such examples, the example picture analyzer circuitry 204 determines the segments based on spatial analysis. For example, the example picture analyzer circuitry 204 may determine segments to differentiate between characters within a frame, differentiate a foreground and a background of the frame, etc. In some examples, the example picture analyzer circuitry 204 determines the number and/or locations of segments within the frame based on a rule set stored in memory. For example, the rule set may divide a frame 102A into segments based on a grid pattern, where each grid contains a specified number of pixels. In some examples, the rule set may additionally or alternatively determine the number and location of segments using one or more different techniques.

The example adaptive QM selector circuitry 206 selects a subset of QMs from a set of default QMs and the set of user-defined QMs 106. The default QMs are QMs that are pre-defined or otherwise initialized within the memory resources of the video encoder circuitry 108 and remain constant between the compression of multiple videos. In some examples, one or more default QMs stored in the example video encoder circuitry 108 may match one or more default QMs used in a prior video coding technique.

The subset of QMs selected by the example adaptive QM selector circuitry 206 are the QMs used to encode the current frame 102A. The example adaptive QM selector circuitry 206 uses the spatial analysis of the current frame 102A provided by the example picture analyzer circuitry 204 to select the subset of QMs. In some examples where the current frame 102B is not the first frame within the input video 102, the example adaptive QM selector circuitry 206 additionally uses feedback from the previously encoded frame 102A to select the subset of QMs. The feedback provided by the example encoder circuitry 210 may describe an error rate and/or quality parameter associated with an entropy coding technique. In some examples where user-defined QMs are not provided, the example adaptive QM selector circuitry implicitly selects QMs. Further details concerning implicit selection and the example adaptive QM selector circuitry 206 are provided in the context of FIG. 7, which is described below.

The example adaptive segment selector circuitry 208 assigns a QM from the subset of QMs for each segment within the current frame 102A. The example adaptive segment selector circuitry 208 may assign QMs based on the number of QMs within the subset of the QMs and the pixel values of the segments. Further details concerning the example adaptive segment selector circuitry 208 are provided in the context of FIG. 8, which is described below.

The example encoder circuitry 210 of FIG. 2 quantizes transform coefficients using the assigned QMs. Each segment within the current frame 102A has one or more associated DCT matrices which describe the pixel values and frequency components within the segment. To quantize the transform coefficients of an associated DCT matrix, the example encoder circuitry 210 may perform elementwise division on the DCT matrix with the assigned QM as described previously. The example encoder circuitry 210 encodes the quantized transform coefficients of the segments within the frames of the input video 102 into the compressed video 110. In some examples, the example encoder circuitry 210 uses an entropy coding technique to encode the quantized transform coefficients. An entropy coding technique is a form of lossless data compression that is independent of any specific video coding standard. Example entropy coding techniques include but are not limited to Huffman coding, arithmetic coding, Elias gamma coding, Fibonacci coding, etc.

The example video encoder circuitry 108 produces a compressed video 110 that has a smaller file size than the input video 102. In doing so, the example video encoder circuitry 108 supports user-defined QMs, does not explicitly encode a QM for each frame, and supports the use of multiple QMs within a single frame.

In some examples, the example video encoder circuitry 108 includes means for accessing an input frame. For example, the means for accessing may be implemented by example QM syntax encoder circuitry 202. In some examples, the example QM syntax encoder circuitry 202 may be instantiated by processor circuitry such as the example processor circuitry 1012 of FIG. 10. For instance, the example QM syntax encoder circuitry 202 may be instantiated by the example general purpose processor circuitry 1100 of FIG. 11 executing machine executable instructions such as that implemented by at least blocks 506 of FIG. 5. In some examples, the example QM syntax encoder circuitry 202 may be instantiated by hardware logic circuitry, which may be implemented by an ASIC or the FPGA circuitry 1200 of FIG. 12 structured to perform operations corresponding to the machine readable instructions. Additionally or alternatively, the example QM syntax encoder circuitry 202 may be instantiated by any other combination of hardware, software, and/or firmware. For example, the example QM syntax encoder circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example video encoder circuitry 108 includes means for encoding a set of user-defined quantization matrices into a sequence header associated with a sequence of video frames including an input frame. For example, the means for encoding may be implemented by example QM syntax encoder circuitry 202. In some examples, the example QM syntax encoder circuitry 202 may be instantiated by processor circuitry such as the example processor circuitry 1012 of FIG. 10. For instance, the example QM syntax encoder circuitry 202 may be instantiated by the example general purpose processor circuitry 1100 of FIG. 11 executing machine executable instructions such as that implemented by at least blocks 504, 602—610 of FIGS. 5, 6. In some examples, the example QM syntax encoder circuitry 202 may be instantiated by hardware logic circuitry, which may be implemented by an ASIC or the FPGA circuitry 1200 of FIG. 12 structured to perform operations corresponding to the machine readable instructions. Additionally or alternatively, the example QM syntax encoder circuitry 202 may be instantiated by any other combination of hardware, software, and/or firmware. For example, the example QM syntax encoder circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example video encoder circuitry 108 includes means for analyzing spatial features of an input frame. For example, the means for analyzing may be implemented by picture analyzer circuitry 204. In some examples, the example picture analyzer circuitry 204 may be instantiated by processor circuitry such as the example processor circuitry 1012 of FIG. 10. For instance, the example picture analyzer circuitry 204 may be instantiated by the example general purpose processor circuitry 1100 of FIG. 11 executing machine executable instructions such as that implemented by at least blocks 508 of FIG. 5. In some examples, the example picture analyzer circuitry 204 may be instantiated by hardware logic circuitry, which may be implemented by an ASIC or the FPGA circuitry 1200 of FIG. 12 structured to perform operations corresponding to the machine readable instructions. Additionally or alternatively, the example picture analyzer circuitry 204 may be instantiated by any other combination of hardware, software, and/or firmware. For example, the example picture analyzer circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example video encoder circuitry 108 includes means for selecting a subset of quantization matrices from a combination of a set of default quantization matrices and a set of user-defined quantization matrices. For example, the means for selecting a subset of quantization matrices may be implemented by example adaptive QM selector circuitry 206. In some examples, the example adaptive QM selector circuitry 206 may be instantiated by processor circuitry such as the example processor circuitry 1012 of FIG. 10. For instance, the example adaptive QM selector circuitry 206 may be instantiated by the example general purpose processor circuitry 1100 of FIG. 11 executing machine executable instructions such as that implemented by at least blocks 510, 702-714 of FIGS. 5, 7. In some examples, the example adaptive QM selector circuitry 206 may be instantiated by hardware logic circuitry, which may be implemented by an ASIC or the FPGA circuitry 1200 of FIG. 12 structured to perform operations corresponding to the machine readable instructions. Additionally or alternatively, the example adaptive QM selector circuitry 206 may be instantiated by any other combination of hardware, software, and/or firmware. For example, the example adaptive QM selector circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example video encoder circuitry 108 includes means for selecting a first one of a subset of quantization matrices for a first segment of an input frame, the input frame to be divided into a plurality of segments including the first segment. For example, the means for selecting a first one of a subset of quantization matrices may be implemented by adaptive segment selector circuitry 208. In some examples, the example adaptive segment selector circuitry 208 may be instantiated by processor circuitry such as the example processor circuitry 1012 of FIG. 10. For instance, the example adaptive segment selector circuitry 208 may be instantiated by the example general purpose processor circuitry 1100 of FIG. 11 executing machine executable instructions such as that implemented by at least blocks 512-516, 802-808 of FIGS. 5, 8. In some examples, the example adaptive segment selector circuitry 208 may be instantiated by hardware logic circuitry, which may be implemented by an ASIC or the FPGA circuitry 1200 of FIG. 12 structured to perform operations corresponding to the machine readable instructions. Additionally or alternatively, the example adaptive segment selector circuitry 208 may be instantiated by any other combination of hardware, software, and/or firmware. For example, the example adaptive segment selector circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example video encoder circuitry 108 includes means for quantizing transform coefficients of the first segment of the input frame based on the first one of the subset of quantization matrices. For example, the means for quantizing may be implemented by example encoder circuitry 210. In some examples, the example encoder circuitry 210 may be instantiated by processor circuitry such as the example processor circuitry 1012 of FIG. 10. For instance, the example encoder circuitry 210 may be instantiated by the example general purpose processor circuitry 1100 of FIG. 11 executing machine executable instructions such as that implemented by at least blocks 522 of FIG. 5.

Figure 12:
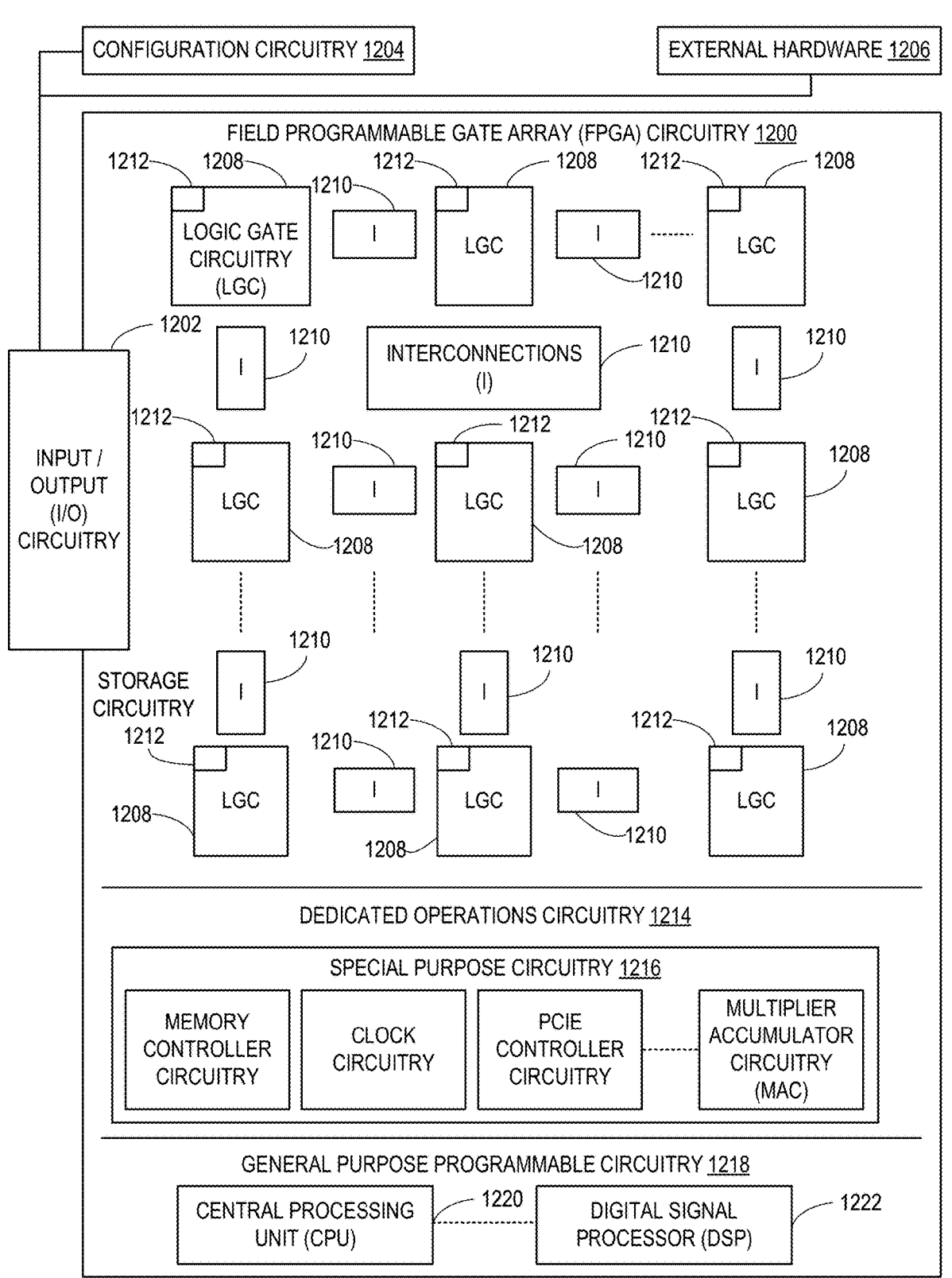
FIG. 12 is a block diagram of another example implementation of the processor circuitry of FIG. 10.

In some examples, the example encoder circuitry 210 may be instantiated by hardware logic circuitry, which may be implemented by an ASIC or the FPGA circuitry 1200 of FIG. 12 structured to perform operations corresponding to the machine readable instructions. Additionally or alternatively, the example encoder circuitry 210 may be instantiated by any other combination of hardware, software, and/or firmware. For example, the example encoder circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

FIG. 3 is a block diagram of an example implementation of the video decoder circuitry 112 of FIG. 1. The example video encoder circuitry 108 of FIG. 3 may be instantiated (e.g., creating an instance of, bring into being for any length of time, materialize, implement, etc.) by processor circuitry such as a central processing unit executing instructions. Additionally or alternatively, the example video decoder circuitry 112 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

The example video decoder circuitry 112 includes example sequence decoder circuitry 302, example frame decoder circuitry 304, example segment decoder circuitry 306, and example dequantizer circuitry 308. The example sequence decoder circuitry 302 of FIG. 3 decodes a sequence header within the compressed video 110. By decoding the sequence header, the example sequence decoder circuitry 302 obtains QM syntax information. QM syntax information includes but is not limited to whether user-defined QMs were used in the compressed video 110, the total number of user-defined QMs in the compressed video 110, QM, and whether implicit QP adaptive QM selection was used in the compressed video 110. Implicit QP adaptive QM selection is described in further detail below.

The example frame decoder circuitry 304 of FIG. 3 derives which QMs were used to compress a given frame. The frame decoder circuitry 304 uses one or more matrix indices encoded within the example compressed video to determine which QMs were used to encode a given frame. The matrix indices point to one or more QMs from a set of both default QMs and user-defined QMs 106.

The example segment decoder circuitry 306 of FIG. 3 assigns QMs used to encode a given frame to segments within the current frame. The example segment decoder circuitry 306 assign one QM to each segment based on sequencing information encoded in a slice header associated with the segment. A slice header is a data structure that describes encoding and display information for a slice. In some examples, a slice is referred to as a segment.

The example dequantizer circuitry 308 of FIG. 3 dequantizes transform blocks. A transform block is the output of a quantization process in which the example encoder circuitry 210 divides a DCT matrix elementwise by a QM of the associated segment (e.g., transform block=DCT matrix/ QM). To dequantize a transform block, the example dequantizer circuitry 308 multiplies the transform block with the assigned QM for the segment, which results in a recovered DCT matrix (e.g., DCT matrix=transform block*QM). The recovered DCT matrices may be used to determine the frequency components of pixel values within the segment. The dequantizer circuitry 308 dequantizes transform blocks of the segments within the current frame, resulting in a recovered frame.

The example video decoder circuitry 112 decompresses video that has been compressed by the example video encoder circuitry 108. The example video decoder circuitry 112 produces recovered frames that collectively compose a recovered video 114, which is a replication of the input video 102.

In some examples, the example video decoder circuitry 112 includes means for determining syntax information for a sequence within compressed video. For example, the means for determining syntax information may be implemented by example sequence decoder circuitry 302. In some examples, the example sequence decoder circuitry 302 may be instantiated by processor circuitry such as the example processor circuitry 1012 of FIG. 10. For instance, the example sequence decoder circuitry 302 may be instantiated by the example general purpose processor circuitry 1100 of FIG. 11 executing machine executable instructions such as that implemented by at least blocks 902 of FIG. 9. In some examples, the example sequence decoder circuitry 302 may be instantiated by hardware logic circuitry, which may be implemented by an ASIC or the FPGA circuitry 1200 of FIG. 12 structured to perform operations corresponding to the machine readable instructions. Additionally or alternatively, the example sequence decoder circuitry 302 may be instantiated by any other combination of hardware, software, and/or firmware. For example, the example sequence decoder circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example video decoder circuitry 112 includes means for deriving quantization matrices used to compress a frame within the sequence, the derived quantization matrices based on the syntax information and a frame header associated with the frame. For example, the means for deriving may be implemented by example frame decoder circuitry 304. In some examples, the example frame decoder circuitry 304 may be instantiated by processor circuitry such as the example processor circuitry 1012 of FIG. 10. For instance, the example frame decoder circuitry 304 may be instantiated by the example general purpose processor circuitry 1100 of FIG. 11 executing machine executable instructions such as that implemented by at least blocks 906, 908 of FIG. 9. In some examples, the example frame decoder circuitry 304 may be instantiated by hardware logic circuitry, which may be implemented by an ASIC or the FPGA circuitry 1200 of FIG. 12 structured to perform operations corresponding to the machine readable instructions. Additionally or alternatively, the example frame decoder circuitry 304 may be instantiated by any other combination of hardware, software, and/or firmware. For example, the example frame decoder circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example video decoder circuitry 112 includes means for assigning the derived quantization matrices to segments within the frame based on a slice header associated with the segment. For example, the means for assigning may be implemented by example segment decoder circuitry 306. In some examples, the example segment decoder circuitry 306 may be instantiated by processor circuitry such as the example processor circuitry 1012 of FIG. 10. For instance, the example segment decoder circuitry 306 may be instantiated by the example general purpose processor circuitry 1100 of FIG. 11 executing machine executable instructions such as that implemented by at least blocks 910, 912 of FIG. 9. In some examples, the example segment decoder circuitry 306 may be instantiated by hardware logic circuitry, which may be implemented by an ASIC or the FPGA circuitry 1200 of FIG. 12 structured to perform operations corresponding to the machine readable instructions. Additionally or alternatively, the example segment decoder circuitry 306 may be instantiated by any other combination of hardware, software, and/or firmware. For example, the example segment decoder circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the example video decoder circuitry 112 includes means for dequantizing transform blocks within the segments based on the assigned quantization matrices, the dequantized transform blocks to form a recovered frame. For example, the means for dequantizing may be implemented by example dequantizer circuitry 308. In some examples, the example dequantizer circuitry 308 may be instantiated by processor circuitry such as the example processor circuitry 1012 of FIG. 10. For instance, the example dequantizer circuitry 308 may be instantiated by the example general purpose processor circuitry 1100 of FIG. 11 executing machine executable instructions such as that implemented by at least blocks 916 of FIG. 9. In some examples, the example dequantizer circuitry 308 may be instantiated by hardware logic circuitry, which may be implemented by an ASIC or the FPGA circuitry 1200 of FIG. 12 structured to perform operations corresponding to the machine readable instructions. Additionally or alternatively, the example dequantizer circuitry 308 may be instantiated by any other combination of hardware, software, and/or firmware. For example, the example dequantizer circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 4:
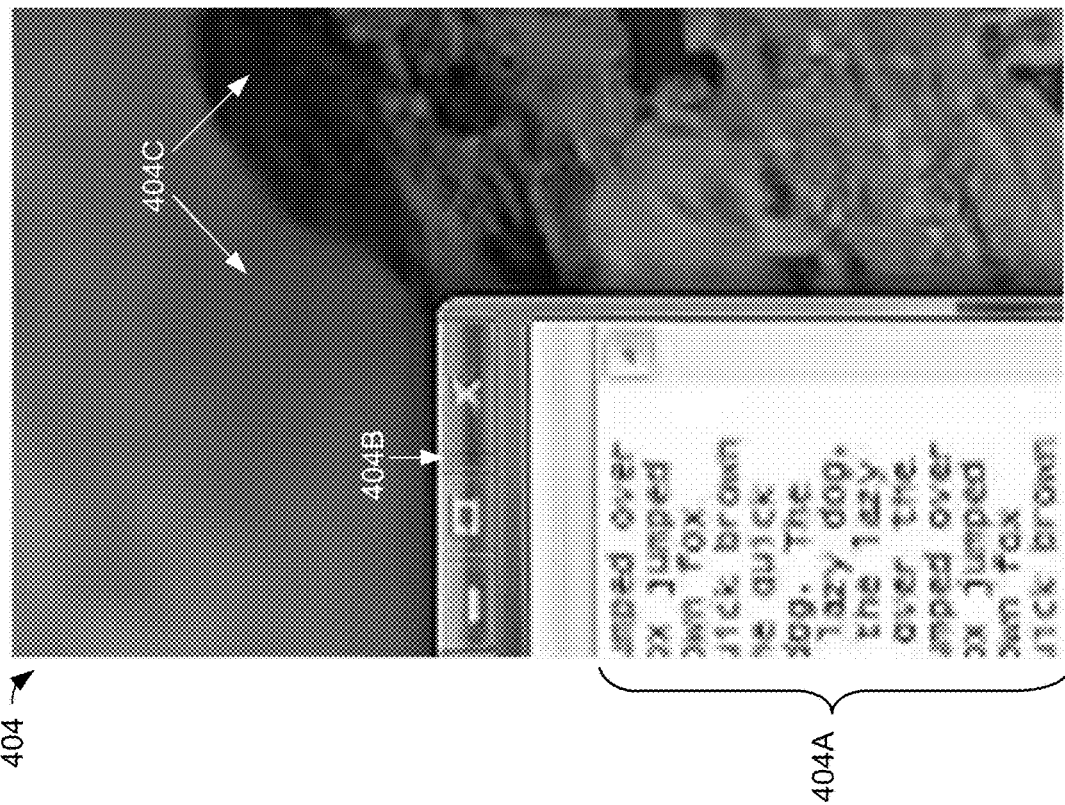
FIG. 4 is an illustrative example of the example system of FIG. 1.
Figure 4:
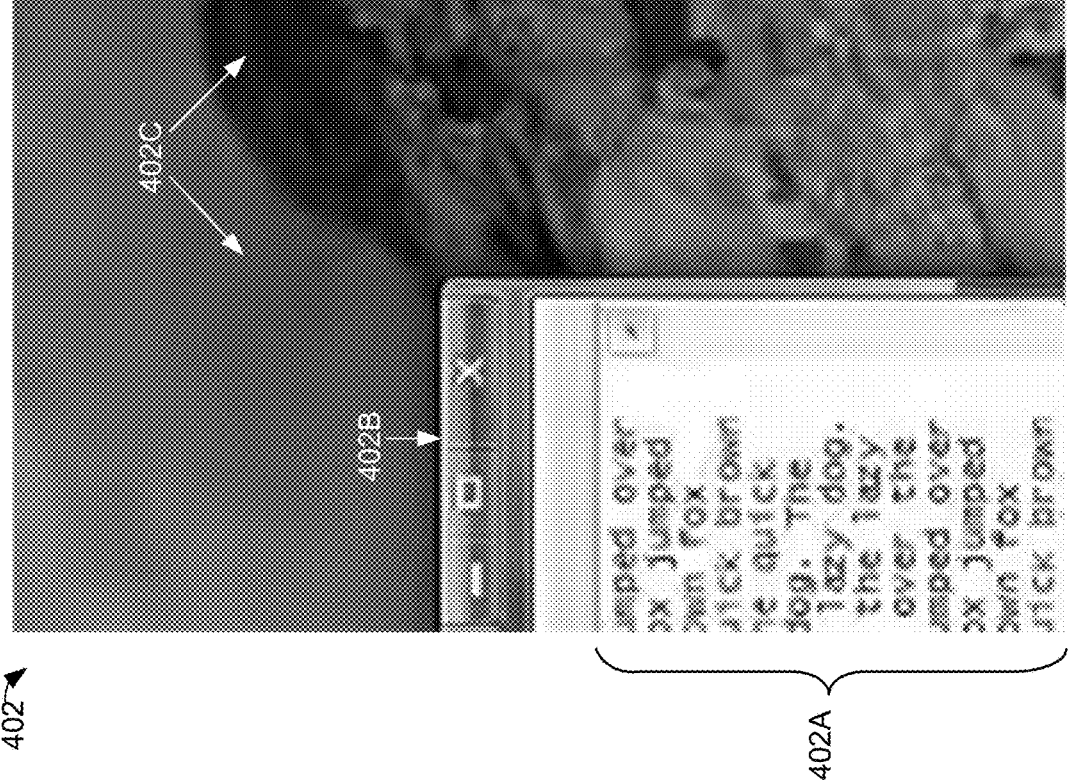

FIG. 4 illustrates an example output of the example system of FIG. 1. FIG. 4 includes a first example image 402 and a second example image 404. The first image 402 of FIG. 4 is an example output resulting from encoding an example input image with the example video encoder circuitry 108 and decoding that encoded image with the example video decoder circuitry 112. For example, the first image 402 can correspond to a portion of a video frame that has been compressed using the example video encoder circuitry 108 and decompressed by the example video decoder circuitry 112. The first image 402 includes example text 402A, an example close button 402B, and an example background 402C.

The second image 404 corresponds to the same portion of the same video frame as the first image, but the video frame displayed in the second image 404 has been compressed and decompressed using a prior video coding technique. Furthermore, the number of bits used by the example system to compress the first image 402 is similar to the number of bits used by the prior video coding technique to compress the second image 404. The second image includes text 404A, a close button 404B, and a background 404C.

FIG. 4. allows for a visual comparison between the example system 100 and the prior video coding technique. The comparison shows that the first image 402 has improved visual quality in some segments of the frame and similar visual quality in other segments relative to the second image 404. Examples of improved visual quality segments may be found in a comparison between the text 402A to the text 404A and a comparison between the close button 402B and the close button 404B. Examples of similar visual quality segments may be found when comparing the background 402C and the background 404C. The example system 100 improves the overall visual quality of video frames compared to the prior video coding technique because the example system 100 supports user-defined QMs, does not explicitly encode a QM for each frame, and supports the use of multiple QMs within a single frame.

While an example manner of implementing the video encoder circuitry 108 of FIG. 1 is illustrated in FIG. 2, one or more of the elements, processes, and/or devices illustrated in FIG. 2 may be combined, divided, re-arranged, omitted, eliminated, and/or implemented in any other way. Further, the example QM syntax encoder circuitry 202, example picture analyzer circuitry 204, example adaptive QM selector circuitry 206, example adaptive segment selector circuitry 208, example encoder circuitry 210, and/or, more generally, the example video encoder circuitry 108 of FIG. 1, may be implemented by hardware alone or by hardware in combination with software and/or firmware. Thus, for example, any of the example QM syntax encoder circuitry 202, example picture analyzer circuitry 204, example adaptive QM selector circuitry 206, example adaptive segment selector circuitry 208, example encoder circuitry 210 and/or, more generally, the example video encoder circuitry 108, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example video encoder circuitry 108 of FIG. 1 may include one or more elements, processes, and/or devices in addition to, or instead of, those illustrated in FIG. 2, and/or may include more than one of any or all of the illustrated elements, processes and devices.

While an example manner of implementing the video decoder circuitry 112 of FIG. 1 is illustrated in FIG. 3, one or more of the elements, processes, and/or devices illustrated in FIG. 3 may be combined, divided, re-arranged, omitted, eliminated, and/or implemented in any other way. Further, the example sequence decoder circuitry 302, example frame decoder circuitry 304, example segment decoder circuitry 306, example dequantizer circuitry, and/or, more generally, the example video decoder circuitry 112 of FIG. 1, may be implemented by hardware alone or by hardware in combination with software and/or firmware. Thus, for example, any of the example sequence decoder circuitry 302, example frame decoder circuitry 304, example segment decoder circuitry 306, example dequantizer circuitry, and/or, more generally, the example video decoder circuitry 112 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example video decoder circuitry 112 of FIG. 1 may include one or more elements, processes, and/or devices in addition to, or instead of, those illustrated in FIG. 3, and/or may include more than one of any or all of the illustrated elements, processes and devices.

Figure 7:
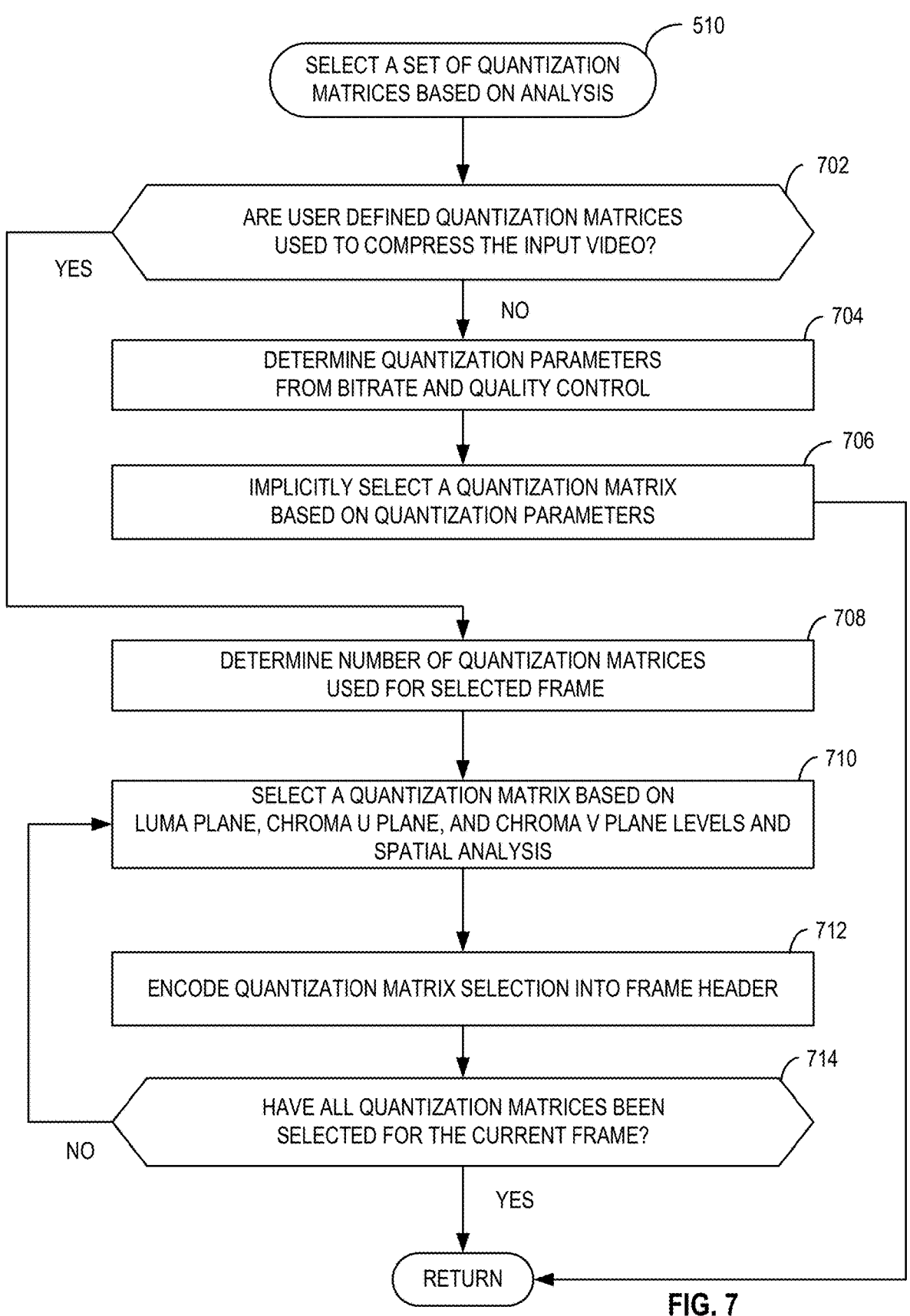
FIG. 7 is a flowchart representative of example machine readable instructions and/or example instructions that may be executed by the example processor circuitry to select a set of QMs as described in FIG. 5.
Figure 8:
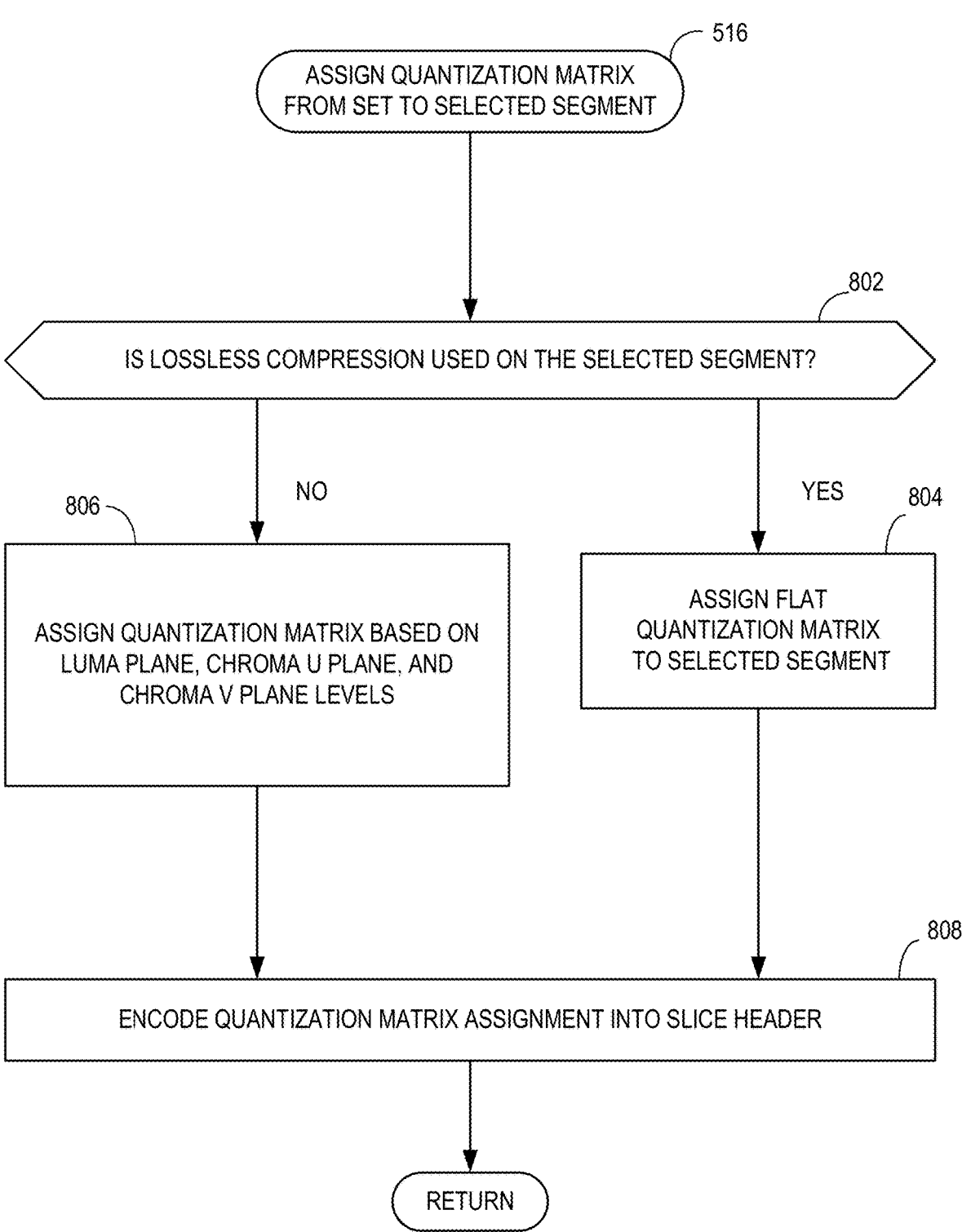
FIG. 8 is a flowchart representative of example machine readable instructions and/or example instructions that may be executed by the example processor circuitry to assign QMs from to a selected segment as described in FIG. 5.
Figure 9:
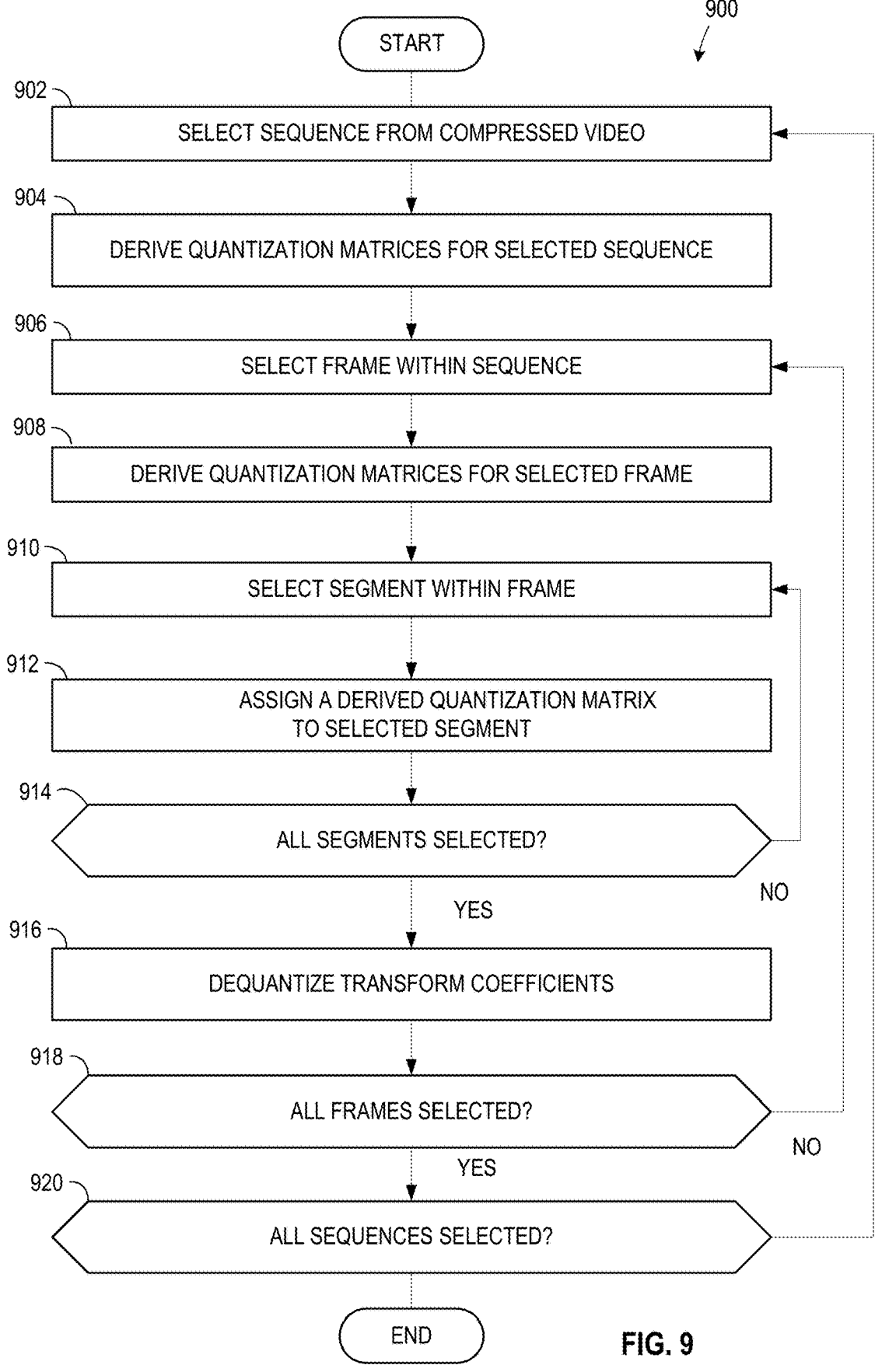
FIG. 9 is a flowchart representative of example machine readable instructions and/or example instructions that may be executed by the example processor circuitry to implement the example video decoder circuitry of FIG. 2.

Flowcharts representative of example hardware logic circuitry, machine readable instructions, hardware implemented state machines, and/or any combination thereof for implementing the example video encoder circuitry 108 of FIG. 2 are shown in FIGS. 5-8. Furthermore, a flowchart representative of example hardware logic circuitry, machine readable instructions, hardware implemented state machines, and/or any combination thereof for implementing the example video decoder circuitry 112 of FIG. 3 is shown in FIG. 9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 5, 6, 8, and 9, many other methods of implementing the example video encoder circuitry 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5, 6, 7, 8, and 9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 5:
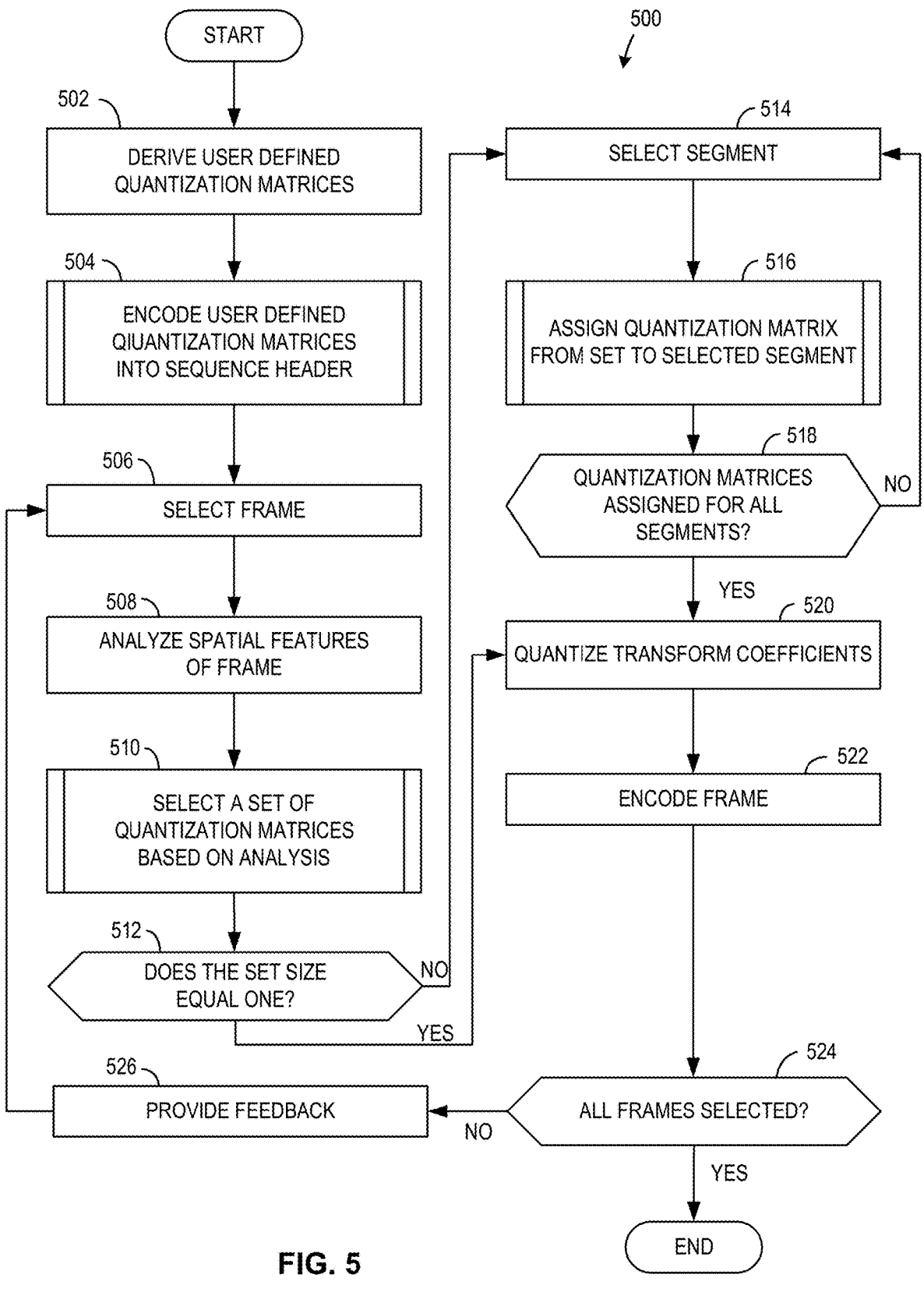
FIG. 5 is a flowchart representative of example machine readable instructions and/or example instructions that may be executed by the example processor circuitry to implement the example video encoder circuitry of FIG. 2.

FIG. 5 is a flowchart representative of example machine readable instructions and/or example operations 500 that may be executed and/or instantiated by processor circuitry to implement the video encoder circuitry 108 to encode video. The machine readable instructions and/or the operations 500 of FIG. 5 begin when the example QM trainer circuitry 104 derives user-defined QMs 106. (Block 502). The example QM trainer circuitry 104 derives user-defined QMs 106 by implementing a training algorithm of any type. In some examples, the QM trainer circuitry 104 may derive user-defined QMs 106 each time an input video 102 is compressed. However, in some examples, the QM trainer circuitry 104 may not derive user-defined QMs 106 each time an input video 102 is compressed. Rather, the example QM trainer circuitry 104 may derive user-defined QMs 106 before any compression of an input video 102. The derived user-defined QMs 106 may include QMs tailored to different video characteristics of multiple input videos 102. Furthermore, the machine readable instructions and/or the operations 500 may proceed to block 502 after one or more videos are compressed to edit the user-defined QMs 106. The example QM trainer circuitry 104 edits the user-defined QMs 106 based on input from a user.

Figure 6:
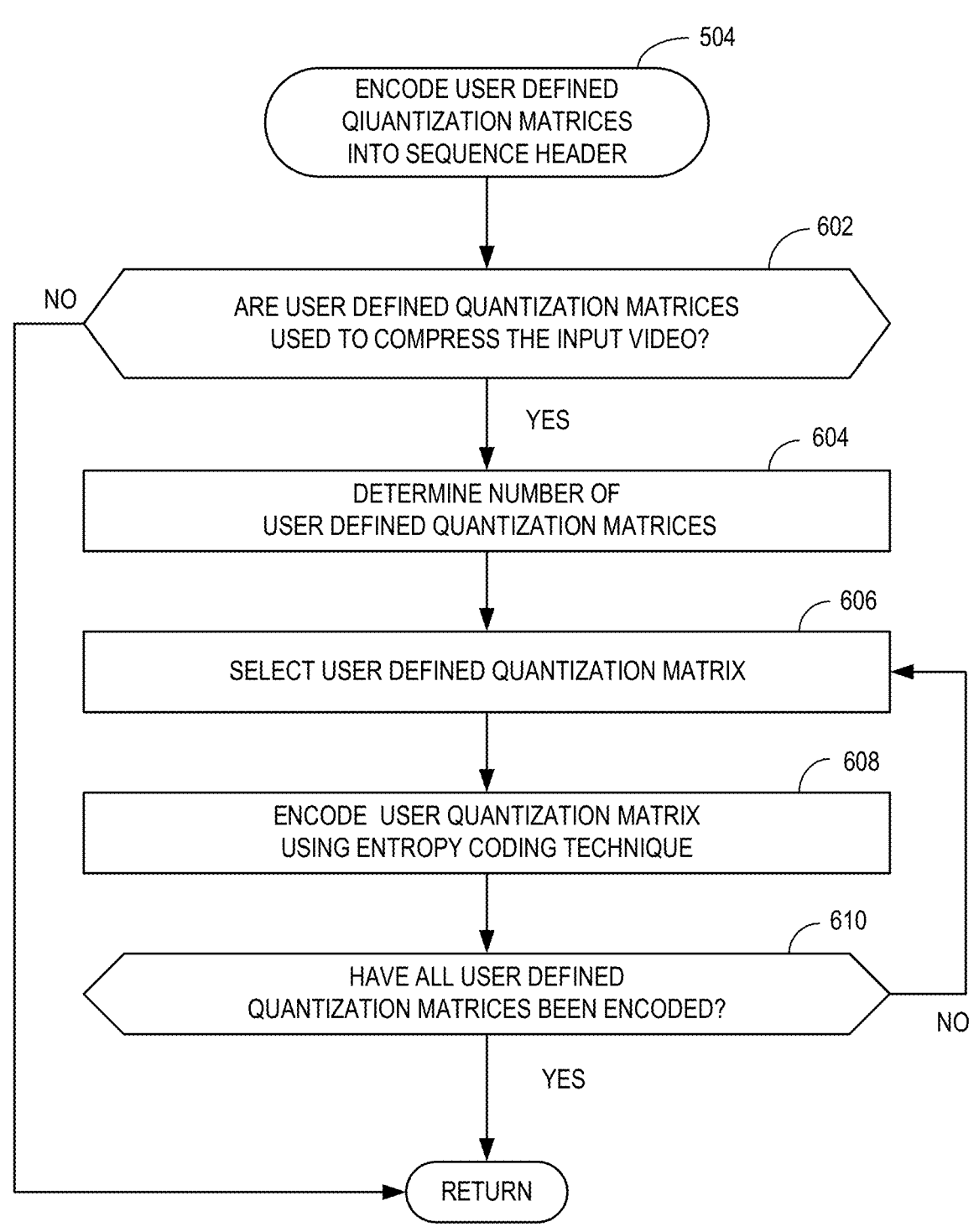
FIG. 6 is a flowchart representative of example machine readable instructions and/or example instructions that may be executed by the example processor circuitry to encode user-defined QMs as described in FIG. 5.

The example QM syntax encoder circuitry 202 encodes the user-defined QMs 106 into a sequence header. (Block 504). A sequence header is a data structure that includes encoding parameters for one or more input frames 102A, 102B as defined previously. Example machine readable instructions and/or example operations that may be used to implement block 504 are illustrated in FIG. 6, which is described below.

The example picture analyzer circuitry 204 selects a frame from the input video 102. (Block 506). The example picture analyzer circuitry 204 may select frames in chronological order as described by the input video 102.

The example picture analyzer circuitry 204 analyzes the spatial features of the frame 102A. (Block 508). Spatial features within the frame 102A may include but are not limited to vectors, lines, polygons, regions, etc. within the frame 102A. The example picture analyzer circuitry 204 may use any technique to analyze spatial features.

The example adaptive QM selector circuitry 206 selects a subset of QMs for use in the selected frame. (Block 510). The subset of QMs are a subset of a larger set of QMs that include the user-defined QMs 106 and default QMs. The example adaptive QM selector circuitry 206 selects the subset of QMs based on the analysis of the spatial features of block 508. In examples where the selected frame 102B referred to in block 506 is not the first frame of the input video 102, the example adaptive QM selector circuitry 206 may additionally select the subset of QMs based on feedback from encoding information of the previous frame 102A. Example machine readable instructions and/or example operations that may be used to implement block 510 are illustrated in FIG. 7, which is described below.

The example adaptive segment selector circuitry 208 determines whether the size of the subset of QMs from block 510 equals one. (Block 512). If the size of the subset of QMs from block 510 does not equal one, the example machine readable instructions and/or operations 500 proceed to block 514 to assign a selected QM from the subset to each segment. If the size of the subset of QMs from block 510 equals one, the example machine readable instructions and/or operations 500 proceeds to block 520 as all segments are automatically assigned the one QM.

The example adaptive segment selector circuitry 208 selects a segment within the selected frame. (Block 514). A segment refers to a portion of a frame that is encoded with a QM.

The example adaptive segment selector circuitry 208 assigns a QM from the subset of the QMs to the selected segment. (Block 516). The example adaptive segment selector circuitry 208 may assign QMs based on the number of QMs within the subset of the QMs and the pixel values of the segments. Example machine readable instructions and/or example operations that may be used to implement block 516 are illustrated in FIG. 8, which is described below.

The example adaptive segment selector circuitry 208 determines whether a QM has been assigned for all segments within the selected frame. (Block 518). If a QM has not been assigned for all segments within the frame 102A, the machine readable instructions and/or the operations 500 proceed to block 514 where the example adaptive segment selector circuitry 208 selects another segment from the frame 102A that does not have an assigned QM.

If a QM has been assigned for all segments within the frame 102A, or if the subset of QMs from block 510 equals one, the example encoder circuitry 210 quantizes transform coefficients of the selected frame. (Block 520). The example encoder circuitry 210 may quantize transform coefficients by dividing a DCT matrix associated with a segment element-wise by the assigned QM of the respective segments. In some examples, the resulting values may be referred to as quantized transform coefficients. In other examples, the resulting values may be referred to as one or more output matrices.

The example encoder circuitry 210 encodes the frames. (Block 522). To encode a frame, the example encoder circuitry 210 inserts the quantized transform coefficients of block 520 into the compressed video 110 using an encoding technique. The example encoder circuitry 210 may use any entropy coding technique as described previously to insert the quantized transform coefficients into the compressed video 110. The machine readable instructions and/or the operations 500 end after the example encoder circuitry 210 encodes all frames to form the compressed video 110.

The example encoder circuitry 210 determines whether all frames in the input video 102 have been selected. (Block 524). If all frames in the input video have been selected, the example video encoder circuitry 108 has created the compressed video 110 and the machine readable instructions and/or the operations 500 end.

If all frames in the input video 102 have not been selected, the example encoder circuitry 210 provides feedback on the previously encoded frame to the example adaptive QM selector circuitry 206. (Block 526). The feedback provided to the example encoder circuitry 210 may describe an error rate or quality parameter associated with the entropy coding technique of block 522. The feedback is used by the example adaptive QM selector circuitry 206 to select an optimal set of QMs for the next frame. After block 526, the machine readable instructions and/or the operations 500 continue to block 506 where the example picture analyzer circuitry 204 selects another frame 102B from the input video 102 that has yet to be selected.

FIG. 6 is a flowchart representative of example machine readable instructions and/or example operations 504 that may be executed to encode user-defined QMs as described in FIG. 5. For example, the example machine readable instructions and/or operations 504 of FIG. 6 describe the execution flow of block 504 of FIG. 5. The example machine readable instructions and/or example operations 504 of FIG. 6 begin when the example QM syntax encoder circuitry 202 determines whether user-defined QMs 106 are used to compress the input video 102. (Block 602). While the example system 100 provides flexibility by offering user-defined QMs 106, in some examples, a given user may decide to not define or use any of the user-defined QMs 106 to compress an input video 102. In such examples, the machine readable instructions and/or operations 504 return to block 506.

If user-defined QMs 106 are used to compress the input video 102, the example QM syntax encoder circuitry 202 determines the number of user-defined QMs 106. (Block 604). The number of user-defined QMs 106 may depend on the number of QMs created by the example QM trainer circuitry 104 and/or manually created by a user.

The example QM syntax encoder circuitry 202 selects a user-defined QM from the user-defined QMs 106. (Block 606). The example QM syntax encoder circuitry 202 then encodes the selected QM into a sequence header using an entropy coding technique. (Block 608). The sequence header contains data that refers to the current frame encoded by the example video encoder circuitry 108. The example QM syntax encoder circuitry 202 may use any entropy coding technique to encode the QM as described previously.

The example QM syntax encoder circuitry 202 determines whether all user-defined QMs have been encoded into the sequence header. (Block 610). The example QM syntax encoder circuitry 202 determines whether all user-defined QMs are encoded based on the total number of user-defined QMs determined in block 604. If all user-defined QMs have not been encoded, the example machine readable instructions and/or example operations 504 continue at block 606 where the example QM syntax encoder circuitry 202 selects another user-defined QM that has not been encoded. The machine readable instructions and/or the operations 504 return to block 500 after the example QM syntax encoder circuitry 202 selects all user-defined QMs.

FIG. 7 is a flowchart representative of example machine readable instructions and/or operation 510 that may be executed to select a set of QMs as described in FIG. 5. For example, the example machine readable instructions and/or operations of 510 of FIG. 7 describe the execution flow of block 510 of FIG. 5 The example machine readable instructions and/or operations 510 begins when the example adaptive QM selector circuitry 206 determines whether user-defined QMs 106 are used to compress the input video 102. (Block 702). The example adaptive QM selector circuitry 206 makes the determination based on user input.

If user-defined QMs 106 are not used to compress input video, the set of user-defined QMs encoded within the sequence header may be referred to as an empty set. In such examples, the example adaptive QM selector circuitry 206 determines quantization parameters (QPs) for the current frame from bitrate and quality control information (Block

704). In such examples, a QP is a value that represents an amount of detail to be saved during compression. For example, the amount of frequency components of a given segment that are stored in the compressed video 110 would be larger with a low QP than a high QP. The example adaptive QM selector circuitry 206 determines QPs based on bitrate and quality control information of the current frame provided by the example picture analyzer circuitry 204. If the current frame being encoded by the example video encoder circuitry 108 is not the first frame of the input video 102, the example adaptive QM selector circuitry 206 may additionally determine QPs based on encoder circuitry 210 feedback from the previous frame.

The example adaptive QM selector circuitry 206 selects a QM implicitly based on QPs. (Block 706). To implicitly select QMs, the example adaptive QM selector circuitry 206 may classify one or more QPs into categories, where the number of categories is equal to the number of default QMs stored in memory. The example adaptive QM selector circuitry 206 may then map a default QM to each category based on the flatness of the QM. The flatness of a QM refers to the amount of elements within the QM that are equivalent to one another. For example, in a completely flat QM, each element of the QM is the same value.

Default QMs may include QMs of variousness flatness to accommodate various desired image quality and compression. For example, because a completely flat QM compresses all frequency components of an image equally, completely flat QMs may result in a high compressed image quality but require a larger amount of data to compress relative to a non-flat QM that removes a greater amount of frequency components at the risk of affecting image quality. As a result, the example adaptive QM selector circuitry 206 may map flat default QMs to categories of low QPs, representing higher image quality and greater amounts of data to compress. Similarly, the example adaptive QM selector circuitry 206 may map non-flat QMs to categories of high QPs, representing lower image quality and lower amounts of data to compress. If user-defined QMs 106 are not used to compress input video, the example machine readable instructions and/or operations 510 end after block 706.

If user-defined QMs 106 are used to compress input video, the example adaptive QM selector circuitry 206 determines the number of QMs used for the current frame. (Block 708). The number of QMs used for the current frame is less than or equal to the number of user-defined QMs encoded into the sequence header in block 608 added to the number of default QMs stored in memory. In some examples, the total number of QMs selected in block 708 is greater than the number of default QMs. As a result, the example adaptive QM selector circuitry 206 may select default QMs in addition to user-defined QMs to compress the current frame. In other examples, the total number of QMs selected in block 708 is equal to the number of default QMs. In such examples, the example adaptive QM selector circuitry 206 selects user-defined QMs instead of default QMs to compress the current frame.

The example adaptive QM selector circuitry 206 selects a QM based on luma plane, chroma U plane, and chroma V plane levels of the QM and the spatial analysis provided by the example picture analyzer circuitry 204. (Block 710). Luma, Chroma U, and Chroma V planes refer to a system of describing pixel values using brightness, blueness, and redness parameters. The luma plane, chroma U plane, and chroma V plane levels of a QM, therefore, refer to the amount of brightness, blueness, and redness data to be compressed from a segment using the QM. The example adaptive QM selector circuitry 206 selects a QM by identifying luma plane, chroma U plane, and chroma V plane levels that would compress a segment within the frame with a desired image quality and data rate. In some examples, the luma plane, chroma U, and chroma V planes are collectively referred to as the YUV color model.

The example adaptive QM selector circuitry 206 encodes the selection of a QM from block 710 into the frame header. (Block 712). A frame header is an amount of metadata that is stored with each frame of a compressed video 110 and contains information regarding encoding and display information for the given frame. The example adaptive QM selector circuitry 206 adaptively encodes a selection based on the number of QMs used for the selected frame as described in block 708. In general, the example adaptive QM selector circuitry 206 may use the minimum number of bits possible to encode a QM selection, where the minimum number of bits is the smallest integer in which 2 to the power of the integer is greater or equal to the number of QMs encoded in the sequence header. For example, if 32 QMs are encoded into the sequence header, the example adaptive QM selector circuitry 206 uses 5 bits to describe which QM was selected in block 710.

The example adaptive QM selector circuitry 206 determines if all QMs have been selected for the current frames. (Block 714). The example adaptive QM selector circuitry 206 makes the determination of block 714 by comparing the total number of selected QMs to the number of QMs determined for use in the current frame at block 708. If all QMs have not been selected for the current frame, the example machine readable instructions and/or operations 510 continue at block 710, where the example adaptive QM selector circuitry 206 selects another QM from the sequence header that has not already been previously selected for the current frame. If all QMs have been selected for the current frame, the example machine readable instructions and/or operations 510 end.

FIG. 8 is a flowchart representative of example machine readable instructions and/or operations 516 that may be executed to assign QMs from to a selected segment as described in FIG. 5. For example, the example machine readable instructions and/or operations of 516 of FIG. 8 describe the execution flow of block 516 of FIG. 5 The example machine readable instructions and/or operations of 516 begin when the example adaptive segment selector circuitry 208 determines whether lossless compression is used on the selected segment. (Block 802). Lossless compression refers to any compression technique in which the original data can be perfectly reconstructed using the compressed data. In some examples, the example adaptive segment selector circuitry 208 makes the determination of block 802 based on the spatial analysis provided by the example picture analyzer circuitry 204. The example adaptive segment selector circuitry 208 may additionally or alternatively make the determination of block 800 based on user input or a pre-determined rule set stored in memory.

If lossless compression is used on the selected segment, the example adaptive segment selector circuitry 208 assigns a flat matrix to the selected segment. (Block 804). The flat matrix from the set of QMs selected for the current frame. The example adaptive segment selector circuitry 208 assigns the flat matrix so the encoder circuitry 210 can compress all frequency components of the segment equally, which allows for the recovered segment to exactly match the original segment.

If lossless compression is not used on the selected segment, the example adaptive segment selector circuitry 208 assigns a QM based on the luma plane, chroma U plane, and chroma V plane levels of the QMs. (Block 806). For example, the example adaptive segment selector circuitry 208 may identify a QM from the set of QMs encoded for the current frame whose YUV color model parameters would result in a desired image quality or amount of data compressed for the selected segment.

The example adaptive segment selector circuitry 208 encodes the QM assignment for the selected segment into the slice header. (Block 808). The example adaptive segment selector circuitry 208 adaptively encodes a selection based on the number of QMs encoded into the frame header at blocks 712. In general, the example adaptive segment selector circuitry 208 may use the minimum number of bits possible to encode a QM assignment, where the minimum number of bits is the smallest integer in which 2 to the power of the integer is greater or equal to the number of QMs encoded in the frame header. For example, if 32 QMs are encoded into the frame header, the example adaptive segment selector circuitry 208 uses 5 bits to describe which QM was assigned in block 712. The machine readable instructions and/or operations 516 end after the example adaptive segment selector circuitry 208 encodes the QM assignment into the frame header.

FIG. 9 is a flowchart representative of example machine readable instructions and/or operations 900 that may be executed by processor circuitry to implement the example video decoder circuitry of FIG. 2. The example machine readable instructions and/or operations 900 begin when the example sequence decoder circuitry 302 selects a sequence from the compressed video 110. (Block 902). A sequence contains encoding and display information for one or more frames as described previously. The example sequence decoder circuitry 302 may select sequences in chronological order as provided by the compressed video 110.

The example sequence decoder circuitry 302 derives QMs for the selected sequence. (Block 904). The example sequence decoder circuitry 302 may derive QMs based on syntax information included within the sequence header of each sequence. Example syntax information includes but is not limited to whether user-defined QMs were used in the compressed video 110, the total number of user-defined QMs in the compressed video 110, the number of QMs in each frame, and whether implicit QP adaptive QM selection was used in the compressed video 110. For example, if the syntax information indicates that 32 QMs were used to encode the selected sequence, the example sequence decoder circuitry 302 may identify which 32 QMs were used by identifying QM indices with lengths of 5 bits within the sequence header.

The example frame decoder circuitry 304 selects a frame. (Block 906). The example frame decoder circuitry 304 may select the frame in sequential order as provided by the selected sequence.

The example frame decoder circuitry 304 derives QMs for the selected frame. (Block 908). The example frame decoder circuitry 304 derives QMs based on the syntax information of block a frame header associated with the selected frame. For example, if the syntax information indicates that implicit adaptive QM selection was used in the selected sequence, the example frame decoder circuitry 304 may implicitly determine which QMs from the set of default QMs are used in the selected frame based on the QPs associated with the frame. Like the example video decoder circuitry 112 implicitly selects QMs using the same technique as the video encoder circuitry 108 described in block 706.

The example segment decoder circuitry 306 selects a segment from within the selected frame. (Block 910). The example segment decoder circuitry 306 then assigns a derived QM of block 908 to the selected segment. (Block 912). To determine which derived QM of block 908 to assign to the selected segment, the example segment decoder circuitry 306 may use the assignment information encoded into a slice header associated with the selected segment as described in block 808.

The example segment decoder circuitry 306 determines whether all segments within the selected frame have been selected. (Block 914). If all segments within the example selected frame have not been selected, the machine readable instructions and/or operations 900 continue at block 910 where the example segment decoder circuitry 306 selects another segment that has not been selected previously.

If all segments within the example frame have been selected, the example dequantizer circuitry 308 dequantizes the transform coefficients of the selected frame. (Block 916). To dequantize the transform coefficients of a given segment, the example dequantizer circuitry 308 multiplies the quantized transform coefficients, which are stored within the compressed video 110, by the assigned QM of the given segment. The dequantized transform blocks may be used to form a recovered frame and to ultimately form a recovered video 114.

The example frame decoder circuitry 304 determines whether all frames within the selected sequence have been selected. (Block 918). If all frames within the selected sequence have been selected, the example machine readable instructions and/or operations 900 proceed to block 910. If all frames within the selected sequence have not been selected, the example machine readable instructions and/or operations 900 continue to block 920 where the example frame decoder circuitry 304 selects another frame within the sequence that has not been previously selected.

The example sequence decoder circuitry 302 determines whether all sequences within the compressed video have been selected. (Block 920). If all sequences within the compressed video have been selected, the example machine readable instructions and/or operations 900 end. If all sequences within the compressed video have not been selected, the example machine readable instructions and/or operations 900 continue to block 902 where the example sequence decoder circuitry 302 selects another sequence that has not been selected previously.

Figure 10:
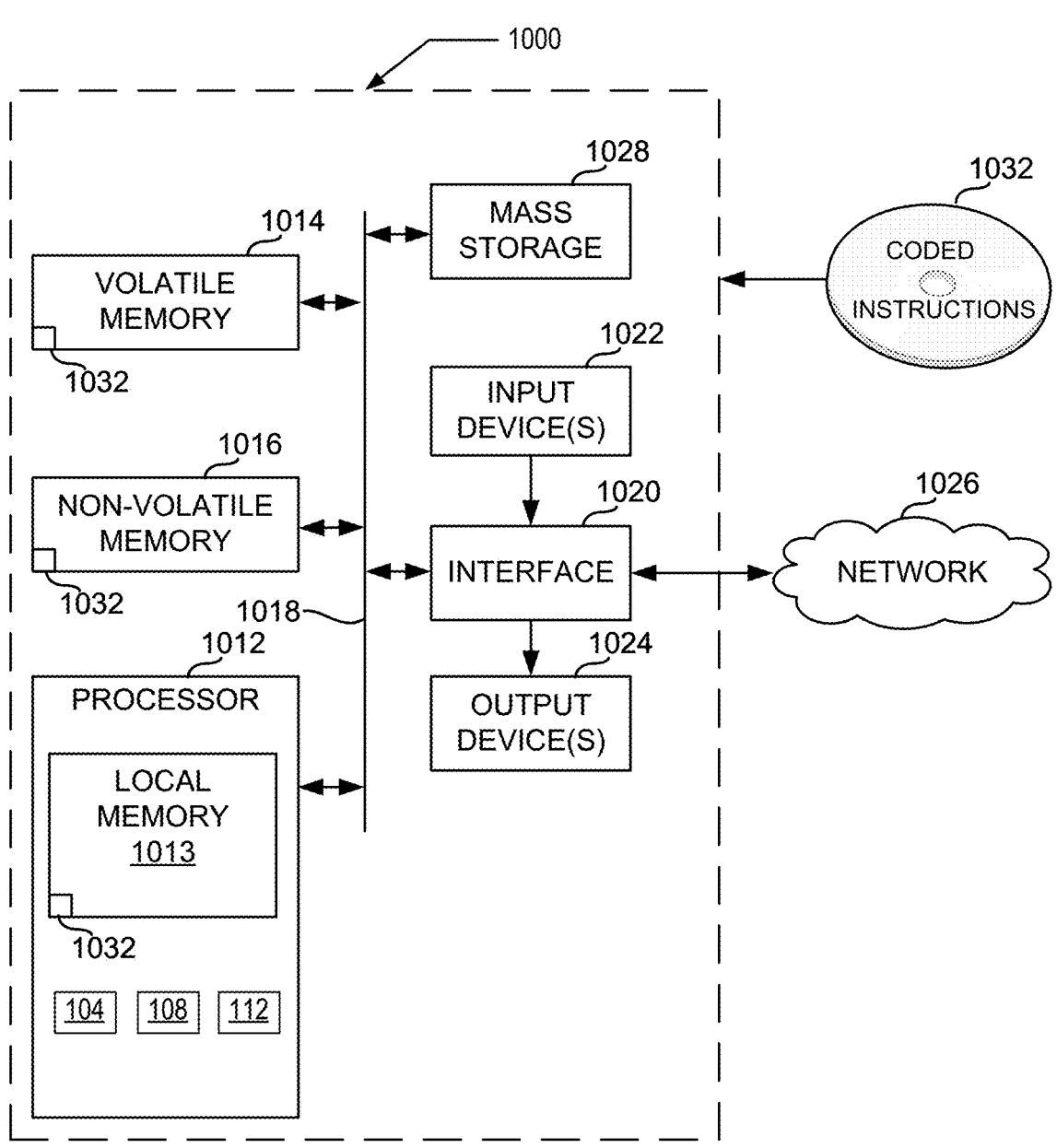
FIG. 10 is a block diagram of an example processing platform including processor circuitry structured to execute the example machine readable instructions and/or the example operations of FIGS. 5, 6, 7, 8, and 9 to implement the example video encoder circuitry of FIG. 2 and/or the example video decoder circuitry of FIG. 3.

FIG. 10 is a block diagram of an example processor platform 1000 structured to execute and/or instantiate the machine readable instructions and/or the operations of FIGS. 5, 6, 7, 8 and 9 to implement the example video encoder circuitry 108 and/or the example video decoder circuitry 112 of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example QM trainer circuitry 104, the example video encoder circuitry 108, and the example video decoder circuitry 112.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1032, which may be implemented by the machine readable instructions of FIGS. 5, 6, 7, 8 and 9, may be stored in the mass storage device 1028, in the volatile memory 1014, in the non-volatile memory 1016, and/or on a removable non-transitory computer readable storage medium such as a CD or DVD.

Figure 11:
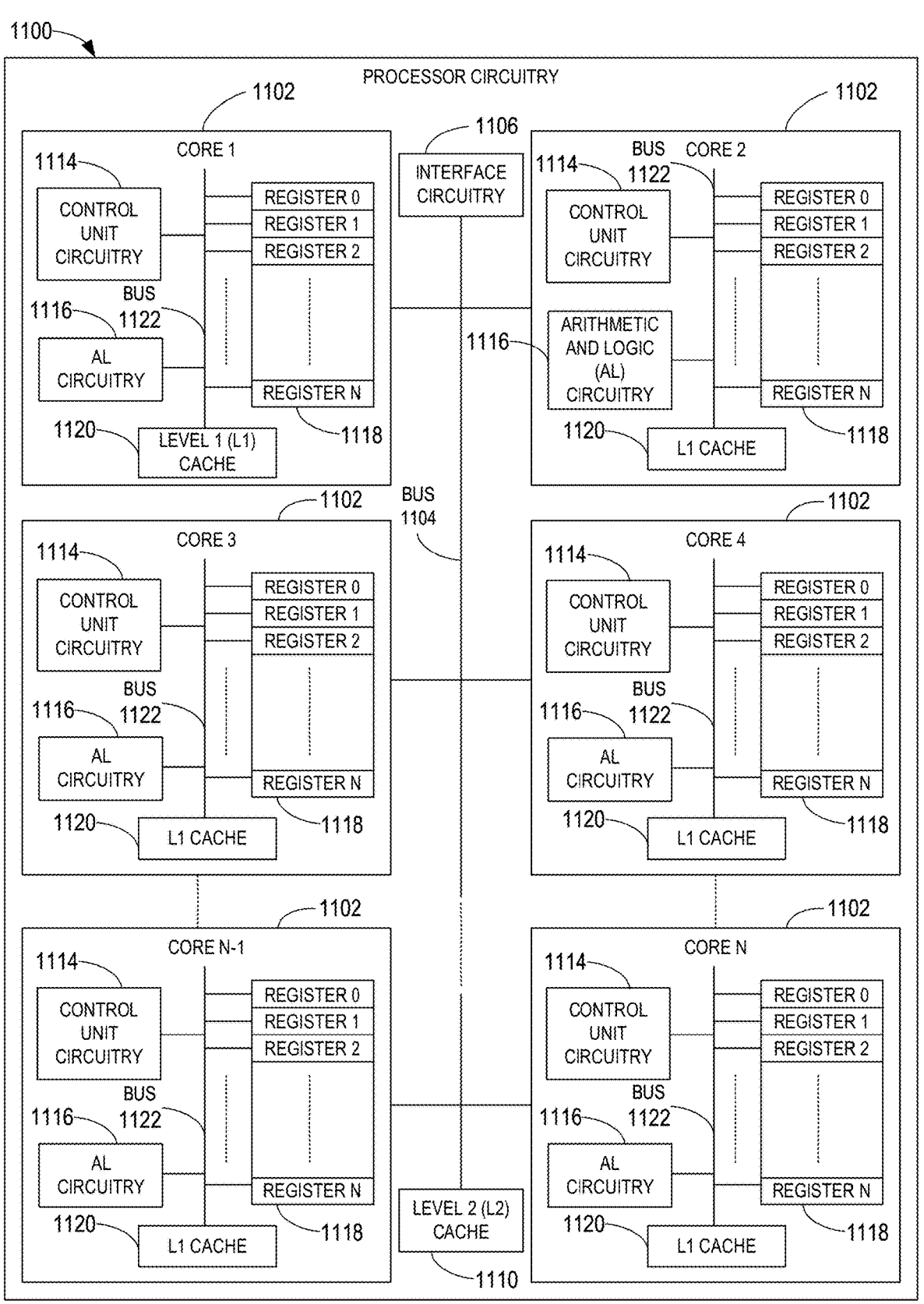
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a general purpose microprocessor 1100. The general purpose microprocessor circuitry 1100 executes some or all of the machine readable instructions of the flowchart of FIG. 11 to effectively instantiate the circuitry of FIG. 2 as logic circuits to perform the operations corresponding to those machine readable instructions. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 5, 6, 7, 8, and 9.

The cores 1102 may communicate by a first example bus 1104. In some examples, the first bus 1104 may implement a communication bus to effectuate communication associated with one(s) of the cores 1102. For example, the first bus 1104 may implement at least one of an Inter-Integrated Circuit (I2C) bus, a Serial Peripheral Interface (SPI) bus, a PCI bus, or a PCIe bus. Additionally or alternatively, the first bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may implement at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 12 is a block diagram of another example implementation of the processor circuitry 412 of FIG. 4. In this example, the processor circuitry 1012 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 5, 6, 7, 8, and 9) but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 5, 6, 7, 8, and 9. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 5, 6, 7, 8, and 9. As such, the FPGA circuitry 1200 may be structured to effectively instantiate some or all of the machine readable instructions of the flowcharts of FIGS. 5, 6, 7, 8, and 9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIG. 10 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIG. and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowchart of FIG. may be executed by one or more of the cores 1102 of FIG. 11 and a second portion of the machine readable instructions represented by the flowcharts of FIGS. 5, 6, 7, 8, and 9 may be executed by the FPGA circuitry 1200 of FIG. 12.

In some examples, the processor circuitry 1012 of FIG. 10 may be in one or more packages. For example, the processor circuitry 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
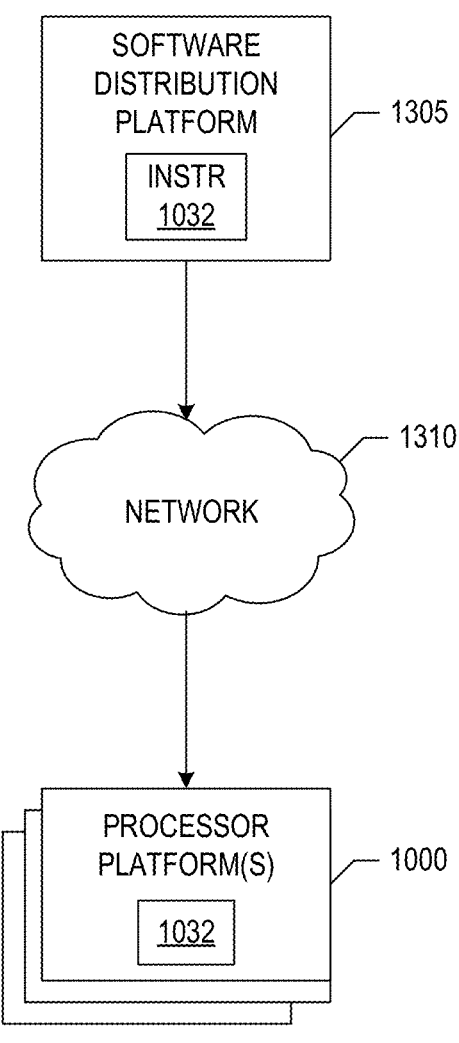
FIG. 13 is a block diagram of an example software distribution platform (e.g., one or more servers) to distribute software (e.g., software corresponding to the example machine readable instructions of FIGS. 5, 6, 7, 8*m* and 9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions of FIGS. 5, 6, 7, 8 and 9, as described above. The one or more servers of the example software distribution platform 1305 are in communication with a network 1310, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 1032 of FIG. 10, may be downloaded to the example processor platform 1000, which is to execute the machine readable instructions 1032 to implement the example video encoder circuitry 108 and example video decoder circuitry 112 In some example, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that encode and decode video using quantization matrices. Disclosed systems, methods, apparatus, and articles of manufacture improve the efficiency of using a computing device by implementing example video coding that supports user-defined QMs, does not explicitly encode a QM for each frame, and supports the use of multiple QMs within a single frame. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to encode video and decode video are disclosed herein. Further examples and combinations thereof include the following.

Example 1 includes an apparatus to encode video, the apparatus comprising interface circuitry to access an input frame of video, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate quantization matrix syntax encoder circuitry to encode a set of user-defined quantization matrices into a sequence header associated with a sequence of video frames including the input frame, adaptive quantization matrix selector circuitry to select a subset of quantization matrices from a combination of a set of default quantization matrices and the set of user-defined quantization matrices, adaptive segment selector circuitry to select a first one of the subset of quantization matrices for a first segment of the input frame, the input frame to be divided into a plurality of segments including the first segment, and encoder circuitry to quantize transform coefficients of the first segment of the input frame based on the first one of the subset of quantization matrices.

Example 2 includes the apparatus of example 1, further including example picture analyzer circuitry to analyze spatial features of the input frame.

Example 3 includes the apparatus of example 2, wherein the input frame is a second frame of the video, the interface circuitry is to access a first frame of the video before the second frame, and the adaptive quantization matrix selector circuitry is to select the subset of quantization matrices based on feedback from quantization of the first frame.

Example 4 includes the apparatus of example 1, wherein the set of user-defined quantization matrices is derived based on at least one machine learning technique, ones of the set of user-defined quantization matrices to be associated with corresponding different video characteristics.

Example 5 includes the apparatus of example 1, wherein the number of quantization matrices in the subset equals the number of default quantization matrices, and to select the subset of quantization matrices, the adaptive quantization matrix selector circuitry is to select ones of the user-defined quantization matrices to replace corresponding ones of the default quantization matrices.

Example 6 includes the apparatus of example 1, wherein the number of quantization matrices in the subset is greater than the number of default quantization matrices, and to select the subset of quantization matrices, the adaptive quantization matrix selector circuitry is to select ones of the user-defined quantization matrices in addition to ones of the default quantization matrices.

Example 7 includes the apparatus of example 1, wherein the set of user-defined quantization matrices is empty, and to select the subset of quantization matrices, the adaptive quantization matrix selector circuitry is to implicitly select quantization matrices based on a quantization parameter.

Example 8 includes the apparatus of example 7, wherein the quantization parameter is one of multiple quantization parameters, and to implicitly select quantization matrices based on a quantization parameter, the adaptive quantization matrix selector circuitry is to classify the multiple quantization parameters into categories, and map a first one of the categories to a first one of the set of default quantization matrices based on values of the quantization parameters in the first one of the categories and flatness of the first one of the set of default quantization matrices.

Example 9 includes the apparatus of example 1, wherein the adaptive quantization matrix selector circuitry is to encode the selection of the subset of quantization matrices into a frame header, a number of bits used to encode the selection to be based on a total number of quantization matrices within a combination of the set of default quantization matrices and the set of user-defined quantization matrices.

Example 10 includes the apparatus of example 1, wherein the adaptive segment selector circuitry is to encode the selection of the first one of the subset of quantization matrices into a frame header, a number of bits used to encode the selection to be based on a number of quantization matrices within the subset of quantization matrices.

Example 11 includes At least one non-transitory machine-readable medium comprising instructions that, when executed, cause at least one processor to at least access an input frame of video, encode a set of user-defined quantization matrices into a sequence header associated with a sequence of video frames including the input frame, select a subset of quantization matrices from a combination of a set of default quantization matrices and the set of user-defined quantization matrices, select a first one of the subset of quantization matrices for a first segment of the input frame, the input frame to be divided into a plurality of segments including the first segment, and quantize transform coefficients of the first segment of the input frame based on the first one of the subset of quantization matrices.

Example 12 includes the at least one non-transitory machine-readable medium of example 11, wherein the instructions, when executed, cause at least one processor to analyze spatial features of the input frame.

Example 13 includes the at least one non-transitory machine-readable medium of example 12, wherein the input frame is a second frame of the video, wherein the instructions, when executed, cause the at least one processor to access a first frame of the video before the second frame, and select the subset of quantization matrices based on and feedback from quantization of the first frame.

Example 14 includes the at least one non-transitory machine-readable medium of example 11, wherein the set of user-defined quantization matrices is derived based on at least one machine learning technique, the set of user-defined quantization matrices to include quantization matrices for various videos.

Example 15 includes the at least one non-transitory machine-readable medium of example 11, wherein the number of quantization matrices in the subset equals the number of default quantization matrices, and to select the subset of quantization matrices, the instructions, when executed, cause the at least one processor to select ones of the user-defined quantization matrices to replace corresponding ones of the default quantization matrices.

Example 16 includes the at least one non-transitory machine-readable medium of example 11, wherein the number of quantization matrices is greater than the number of default quantization matrices, and to select the subset of quantization matrices, the instructions, when executed, cause the at least one processor to select ones of the user-defined quantization matrices in addition to ones of the default quantization matrices.

Example 17 includes the at least one non-transitory machine-readable medium of example 11, wherein the set of user-defined quantization matrices is empty, and to select the subset of quantization matrices, the instructions, when executed, cause the at least one processor to implicitly select quantization matrices based on a quantization parameter.

Example 18 includes the at least one non-transitory machine-readable medium of example 17, wherein the quantization parameter is one of multiple quantization parameters, and to implicitly select quantization matrices based on a quantization parameter, the instructions, when executed, cause the at least one processor to classify the multiple quantization parameters into categories, and map a first one of the categories to a first one of the set of default quantization matrices based on values of the quantization parameters in the first one of the categories and flatness of the first one of the set of default quantization matrices.

Example 19 includes the at least one non-transitory machine-readable medium of example 11, wherein the instructions, when executed, cause the at least one processor to encode the selection of the subset of quantization matrices into a frame header, a number of bits used to encode the selection to be based on a total number of quantization matrices within a combination of the set of default quantization matrices and the set of user-defined quantization matrices.

Example 20 includes the at least one non-transitory machine-readable medium of example 11, wherein the instructions, when executed, cause the at least one processor to encode the selection of the first one of the subset of quantization matrices into a frame header, a number of bits used to encode the selection to be based on a number of quantization matrices within the subset of quantization matrices.

Example 21 includes a method to encode video, the method comprising accessing an input frame of video, encoding a set of user-defined quantization matrices into a sequence header associated with a sequence of video frames including the input frame, selecting a subset of quantization matrices from a combination of a set of default quantization matrices and the set of user-defined quantization matrices, selecting a first one of the subset of quantization matrices for a first segment of the input frame, the input frame to be divided into a plurality of segments including the first segment, and quantizing transform coefficients of the first segment of the input frame based on the first one of the subset of quantization matrices.

Example 22 includes the method of example 21, further including analyzing spatial features of the input frame.

Example 23 includes the method of example 22, wherein the input frame is a second frame of the video, further including accessing a first frame of the video before the second frame, and selecting the subset of quantization matrices based on feedback from quantization of the first frame.

Example 24 includes the method of example 21, wherein the set of user-defined quantization matrices is derived based on at least one machine learning technique, the set of user-defined quantization matrices to include quantization matrices for various videos.

Example 25 includes the method of example 21, wherein the number of quantization matrices in the subset equals the number of default quantization matrices, and selecting the subset of quantization matrices further includes selecting ones of the user-defined quantization matrices to replace corresponding ones of the default quantization matrices.

Example 26 includes the method of example 21, wherein the number of quantization matrices is greater than the number of default quantization matrices, and selecting the subset of quantization matrices further includes selecting ones of the user-defined quantization matrices in addition to ones of the default quantization matrices.

Example 27 includes the method of example 21, wherein the set of user-defined quantization matrices is empty, and selecting the subset of quantization matrices further includes implicitly selecting quantization matrices based on a quantization parameter.

Example 28 includes the method of example 27, wherein the quantization parameter is one of multiple quantization parameters, and implicitly selecting quantization matrices based on a quantization parameter further includes classifying the multiple quantization parameters into categories, and mapping a first one of the categories to a first one of the set of default quantization matrices, based on values of the quantization parameters in the first one of the categories and flatness of the first one of the set of default quantization matrices.

Example 29 includes the method of example 21, the method further including encoding the selection of the subset of quantization matrices into a frame header, a number of bits used to encode the selection to be based on a total number of quantization matrices within a combination of the set of default quantization matrices and the set of user-defined quantization matrices.

Example 30 includes the method of example 21, further including encoding the selection of the first one of the subset of quantization matrices into a frame header, a number of bits used to encode the selection to be based on a number of quantization matrices within the subset of quantization matrices.

Example 31 includes an apparatus to encode video, the apparatus comprising means for accessing an input frame of a video, means for encoding a set of user-defined quantization matrices into a sequence header associated with a sequence of video frames including the input frame, means for selecting a subset of quantization matrices from a combination of a set of default quantization matrices and the set of user-defined quantization matrices, means for selecting a first one of the subset of quantization matrices for a first segment of the input frame, the input frame to be divided into a plurality of segments including the first segment, and means for quantizing transform coefficients of the first segment of the input frame based on the first one of the subset of quantization matrices.

Example 32 includes the apparatus of example 31, further including means for analyzing spatial features of the input frame.

Example 33 includes the apparatus of example 32, wherein the input frame is a second frame of the video, further including means for accessing a first frame of the video before the second frame, and means for selecting the subset of quantization matrices based on feedback from quantization of the first frame.

Example 34 includes the apparatus of example 31, wherein the set of user-defined quantization matrices is derived based on at least one machine learning technique, the set of user-defined quantization matrices to include quantization matrices for various videos.

Example 35 includes the apparatus of example 31, wherein the number of quantization matrices in the subset equals the number of default quantization matrices, and the means for selecting the subset of quantization matrices further includes means for selecting ones of the user-defined quantization matrices to replace corresponding ones of the default quantization matrices.

Example 36 includes the apparatus of example 31, wherein the number of quantization matrices is greater than the number of default quantization matrices, and the means for selecting the subset of quantization matrices further includes means for selecting ones of the user-defined quantization matrices in addition to ones of the default quantization.

Example 37 includes the apparatus of example 31, wherein the set of user-defined quantization matrices is empty, and the means for selecting the subset of quantization matrices further includes means for implicitly selecting quantization matrices based on a quantization parameter.

Example 38 includes the apparatus of example 37, wherein the quantization parameter is one of multiple quantization parameters, and the means for implicitly selecting quantization matrices based on a quantization parameter further includes means for classifying the multiple quantization parameters into categories, and means for mapping a first one of the categories to a first one of the set of default quantization matrices based on values of the quantization parameters in the first one of the categories and flatness of the first one of the set of default quantization matrices.

Example 39 includes the apparatus of example 31, further includes means for encoding the selection of the subset of quantization matrices into a frame header, a number of bits used to encode the selection based on a total number of quantization matrices within a combination of the set of default quantization matrices and the set of user-defined quantization matrices.

Example 40 includes the apparatus of example 31, further includes means for encoding the selection of the first one of the subset of quantization matrices into a frame header, a number of bits used to encode the selection to be based on a number of quantization matrices within the subset of quantization matrices.

Example 41 includes an apparatus to decode video, the apparatus comprising sequence decoder circuitry to determine syntax information for a sequence within compressed video, the syntax information to describe whether a set of quantization matrices used to compress the sequence includes user-defined quantization matrices, and whether implicit selection was used to form the set of quantization matrices used to compress the sequence, frame decoder circuitry to derive quantization matrices used to compress a frame within the sequence, the derived quantization matrices based on the syntax information and a frame header associated with the frame, segment decoder circuitry to assign the derived quantization matrices to segments within the frame based on a slice header associated with the segment, and dequantizer circuitry to dequantize transform blocks within the segments based on the assigned quantization matrices, the dequantized transform blocks to form a recovered frame.

Example 42 includes the apparatus of example 41, wherein the frame header describes a selection of quantization matrices used to compress the frame, the selection of quantization matrices from the set of quantization matrices.

Example 43 includes the apparatus of example 41, wherein the sequence decoder circuitry determines the set includes default quantization matrices in response to a determination that the set of quantization matrices used to compress the sequence does not include user-defined quantization matrices.

Example 44 includes the apparatus of example 41, wherein the sequence decoder circuitry determines the set includes user-defined quantization matrices and default quantization matrices in response to a determination that the set of quantization matrices used to compress the sequence includes user-defined quantization matrices.

Example 45 includes the apparatus of example 41, wherein in response to a determination that implicit selection was used to form the set of quantization matrices used to compress the sequence, the frame decoder circuitry is to derive the quantization matrices used to compress the frame within the sequence based on multiple quantization parameters.

Example 46 includes the apparatus of example 45, wherein to derive the quantization matrices used to compress the frame within the sequence, the frame decoder circuitry is to classify the multiple quantization parameters into categories, and map a first one of the categories to a first one of default quantization matrices, the mapping based on values of the quantization parameters in the first one of the categories and flatness of the first one of the default quantization matrices.

Example 47 includes the apparatus of example 41, wherein the segment decoder circuitry is to assign the derived quantization matrices based on a number of bits in a slice header, the number of bits based on a number of derived quantization matrices.

Example 48 includes At least one non-transitory machine-readable medium comprising instructions that, when executed, cause at least one processor to at least determine whether a set of quantization matrices used to compress a sequence within compressed video includes user-defined quantization matrices, determine whether implicit selection was used to form the set of quantization matrices used to compress the sequence, derive quantization matrices used to compress a frame within the sequence, the derived quantization matrices based on the determinations and a frame header associated with the frame, assign the derived quantization matrices to segments within the frame based on a slice header associated with the segment, and dequantize transform blocks within the segments based on the assigned quantization matrices, the dequantized transform blocks to form a recovered frame.

Example 49 includes the at least one non-transitory machine-readable medium of example 48, wherein the frame header describes a selection of quantization matrices used to compress the frame, the selection of quantization matrices from the set of quantization matrices.

Example 50 includes the at least one non-transitory machine-readable medium of example 48, wherein the instructions, when executed, cause the at least one processor to determine the set includes user-defined quantization matrices and default quantization matrices in response to a determination that the set of quantization matrices used to compress the sequence includes user-defined quantization matrices.

Example 51 includes the at least one non-transitory machine readable medium of example 48, wherein the instructions, when executed, cause the at least one processor to determine the set includes default quantization matrices in response to a determination that the set of quantization matrices used to compress the sequence does not include user-defined quantization matrices.

Example 52 includes the at least one non-transitory machine readable medium of example 48, wherein in response to a determination that implicit selection was used to form the set of quantization matrices used to compress the sequence, the instructions, when executed, cause the at least one processor to derive the quantization matrices used to compress the frame within the sequence based on multiple quantization parameters.

Example 53 includes the at least one non-transitory machine readable medium of example 52, wherein to derive the quantization matrices used to compress the frame within the sequence, the instructions, when executed, cause the at least one processor to classify the multiple quantization parameters into categories, and map a first one of the categories to a first one of default quantization matrices, the mapping based on values of the quantization parameters in the first one of the categories and flatness of the first one of the default quantization matrices.

Example 54 includes the at least one non-transitory machine readable medium of example 48, wherein the instructions, when executed, cause the at least one processor to assign the derived quantization matrices based on a number of bits in a slice header, the number of bits based on a number of derived quantization matrices.

Example 55 includes a method to decode video, the method comprising determining syntax information for a sequence within compressed video, the syntax information to describe whether a set of quantization matrices used to compress the sequence includes user-defined quantization matrices, and whether implicit selection was used to form the set of quantization matrices used to compress the sequence, deriving quantization matrices used to compress a frame within the sequence, the derived quantization matrices based on the syntax information and a frame header associated with the frame, assigning the derived quantization matrices to segments within the frame based on a slice header associated with the segment, and dequantizing transform blocks within the segments based on the assigned quantization matrices, the dequantized transform blocks to form a recovered frame.

Example 56 includes the method of example 55, wherein the frame header describes a selection of quantization matrices used to compress the frame, the selection of quantization matrices from the set of quantization matrices.

Example 57 includes the method of example 55, further including determining the set includes default quantization matrices in response to a determination that the set of quantization matrices used to compress the sequence does not include user-defined quantization matrices.

Example 58 includes the method of example 55, further including determining the set includes user-defined quantization matrices and default quantization matrices in response to a determination that the set of quantization matrices used to compress the sequence includes user-defined quantization matrices.

Example 59 includes the method of example 55, wherein in response to a determination that implicit selection was used to form the set of quantization matrices used to compress the sequence, the method further includes deriving quantization matrices used to compress the frame within the sequence based on multiple quantization parameters.

Example 60 includes the method of example 59, wherein deriving quantization matrices used to compress the frame within the sequence includes classifying the multiple quantization parameters into categories, and mapping a first one of the categories to a first one of default quantization matrices, the mapping based on values of the quantization parameters in the first one of the categories and flatness of the first one of the default quantization matrices.

Example 61 includes the method of example 55, further including assigning the derived quantization matrices based on a number of bits in a slice header, the number of bits based on a number of derived quantization matrices.

Example 62 includes an apparatus to decode video, the apparatus comprising means for determining syntax information for a sequence within compressed video, the syntax information to describe whether a set of quantization matrices used to compress the sequence includes user-defined quantization matrices, and whether implicit selection was used to form the set of quantization matrices used to compress the sequence, means for deriving quantization matrices used to compress a frame within the sequence, the derived quantization matrices based on the syntax information and a frame header associated with the frame, means for assigning the derived quantization matrices to segments within the frame based on a slice header associated with the segment, and means for dequantizing transform blocks within the segments based on the assigned quantization matrices, the dequantized transform blocks to form a recovered frame.

Example 63 includes the apparatus of example 62, wherein the frame header describes a selection of quantization matrices used to compress the frame, the selection of quantization matrices from the set of quantization matrices.

Example 64 includes the apparatus of example 62, further including means for determining the set includes default quantization matrices in response to a determination that the set of quantization matrices used to compress the sequence does not include user-defined quantization matrices.

Example 65 includes the apparatus of example 62, further including means for determining the set includes user-defined quantization matrices and default quantization matrices in response to a determination that the set of quantization matrices used to compress the sequence includes user-defined quantization matrices.

Example 66 includes the apparatus of example 62, wherein in response to a determination that implicit selection was used to form the set of quantization matrices used to compress the sequence, the apparatus further includes means for deriving quantization matrices based on multiple quantization parameters.

Example 67 includes the apparatus of example 66, wherein the means for deriving further includes means for classifying the multiple quantization parameters into categories, and means for mapping a first one of the categories to a first one of default quantization matrices, the mapping based on values of the quantization parameters in the first one of the categories and flatness of the first one of the default quantization matrices.

Example 68 includes the apparatus of example 62, further including means for assigning the derived quantization matrices based on a number of bits in a slice header, the number of bits based on a number of derived quantization matrices.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to encode video, the apparatus comprising:
interface circuitry to access a first an initial input frame and a second subsequent input frame of video;
machine readable instructions; and
processor circuitry to at least one of instantiate or execute the machine readable instructions to:
encode a set of user-defined quantization matrices into a sequence header associated with a sequence of video frames including the initial input frame and the subsequent input frame;
quantize the initial input frame based on a first subset of quantization matrices from a combination of a set of default quantization matrices and the set of user-defined quantization matrices;
after the quantization of the initial input frame, select a different second subset of quantization matrices for the subsequent input frame based on encoding information from the initial input frame, the second subset of quantization matrices and the first subset of quantization matrices having at least one quantization matrix not in common, the second subset of quantization matrices from a combination of the set of default quantization matrices and the set of user-defined quantization matrices; and
quantize transform coefficients of the subsequent input frame based on the second subset of quantization matrices.

2. The apparatus of claim 1, including example picture analyzer circuitry to analyze spatial features of the initial input frame and the subsequent input frame.

3. The apparatus of claim 1, wherein the processor circuitry is to;
encode the initial input frame based on the first subset of quantization matrices to determine an encoded frame; and
select the second subset of quantization matrices based on one or more of an error rate or quality parameter associated with the encoded frame.

4. The apparatus of claim 1, wherein the set of user-defined quantization matrices is derived based on at least one machine learning technique, ones of the set of user-defined quantization matrices to be associated with corresponding different video characteristics.

5. The apparatus of claim 1, wherein a number of quantization matrices in the second subset equals a number of default quantization matrices, and to select the second subset of quantization matrices, the processor circuitry is to select ones of the user-defined quantization matrices to replace corresponding ones of the default quantization matrices in the second subset of quantization matrices.

6. The apparatus of claim 1, wherein a number of quantization matrices in the second subset is greater than a number of default quantization matrices, and to select the second subset of quantization matrices, the processor circuitry is to select ones of the user-defined quantization matrices in addition to ones of the default quantization matrices to include in the second subset of quantization matrices.

7. The apparatus of claim 1, wherein the set of user-defined quantization matrices is empty, and to select the second subset of quantization matrices, the processor circuitry is to implicitly select quantization matrices based on a quantization parameter.

8. The apparatus of claim 7, wherein the quantization parameter is one of multiple quantization parameters, and to implicitly select quantization matrices based on a quantization parameter, the processor circuitry is to:
classify the multiple quantization parameters into categories; and
map a first one of the categories to a first one of the set of default quantization matrices based on values of the quantization parameters in the first one of the categories and flatness of the first one of the set of default quantization matrices.

9. The apparatus of claim 1, wherein the processor circuitry is to encode the selection of the second subset of quantization matrices into a frame header, a number of bits used to encode the selection to be based on a total number of quantization matrices within a combination of the set of default quantization matrices and the set of user-defined quantization matrices.

10. The apparatus of claim 1, wherein:
the subsequent input frame is divided into a plurality of segments including a first segment; and
the processor circuitry is to:
select a first one of the second subset of quantization matrices to be used to quantize the first segment; and
encode the selection of the first one of the second subset of quantization matrices into a frame header, a number of bits used to encode the selection to be based on a number of quantization matrices within the subset of quantization matrices.

11. At least one non-transitory machine-readable medium comprising instructions to cause at least one processor circuit to at least:
access an initial input frame and a subsequent input frame of video;
encode a set of user-defined quantization matrices into a sequence header associated with a sequence of video frames including the initial input frame and the subsequent input frame;
quantize the initial input frame based on a first subset of quantization matrices from a combination of a set of default quantization matrices and the set of user-defined quantization matrices;
after the quantization of the initial input frame, select a different second subset of quantization matrices for the subsequent input frame based on encoding information from the initial input frame, the second subset of quantization matrices and the first subset of quantization matrices having at least one quantization matrix not in common, the second subset of quantization matrices from a combination of the set of default quantization matrices and the set of user-defined quantization matrices; and
quantize transform coefficients of the subsequent input frame based on the second subset of quantization matrices.

12. The at least one non-transitory machine-readable medium of claim 11, wherein the instructions are to cause one or more of the at least one processor circuit to analyze spatial features of the initial input frame and the subsequent input frame.

13. The at least one non-transitory machine-readable medium of claim 12, wherein the instructions are to cause one or more of the at least one processor circuit to;
encode the initial input frame of the video based on the first subset of quantization matrices to determine an encoded frame; and
select the second subset of quantization matrices based on one or more of an error rate or quality parameter associated with the encoded frame.

14. The at least one non-transitory machine-readable medium of claim 11, wherein the set of user-defined quantization matrices is derived based on at least one machine learning technique, the set of user-defined quantization matrices to include quantization matrices for various videos.

15. The at least one non-transitory machine-readable medium of claim 11, wherein a number of quantization matrices in the second subset equals a number of default quantization matrices, and to select the second subset of quantization matrices, the instructions are to cause one or more of the at least one processor circuit to select ones of the user-defined quantization matrices to replace corresponding ones of the default quantization matrices in the second subset of quantization matrices.

16. The at least one non-transitory machine-readable medium of claim 11, wherein a number of quantization matrices is greater than a number of default quantization matrices, and to select the second subset of quantization matrices, the instructions are to cause one or more of the at least one processor circuit to select ones of the user-defined quantization matrices in addition to ones of the default quantization matrices to be included in the second subset of quantization matrices.

17. The at least one non-transitory machine-readable medium of claim 11, wherein the set of user-defined quantization matrices is empty, and to select the second subset of quantization matrices, the instructions are to cause one or more of the at least one processor circuit to implicitly select quantization matrices based on a quantization parameter.

18. The at least one non-transitory machine-readable medium of claim 17, wherein the quantization parameter is one of multiple quantization parameters, and to implicitly select quantization matrices based on a quantization parameter, the instructions are to cause one or more of the at least one processor circuit to:
classify the multiple quantization parameters into categories; and
map a first one of the categories to a first one of the set of default quantization matrices based on values of the quantization parameters in the first one of the categories and flatness of the first one of the set of default quantization matrices.

19. The at least one non-transitory machine-readable medium of claim 11, wherein the instructions are to cause one or more of the at least one processor circuit to encode the selection of the second subset of quantization matrices into a frame header, a number of bits used to encode the selection to be based on a total number of quantization matrices within a combination of the set of default quantization matrices and the set of user-defined quantization matrices.

20. The at least one non-transitory machine-readable medium of claim 11, wherein:
the subsequent input frame is divided into a plurality of segments including a first segment; and
the instructions are to cause one or more of the at least one processor circuit to:
select a first one of the second subset of quantization matrices to be used to quantize the first segment; and
encode the selection of the first one of the second subset of quantization matrices into a frame header, a number of bits used to encode the selection to be based on a number of quantization matrices within the second subset of quantization matrices.

21. A method to encode video, the method comprising:
accessing an initial input frame and a subsequent input frame of video;
encoding a set of user-defined quantization matrices into a sequence header associated with a sequence of video frames including the initial input frame and the subsequent input frame;
quantizing the initial input frame based on a first subset of quantization matrices from a combination of a set of default quantization matrices and the set of user-defined quantization matrices;
after the quantization of the initial input frame, selecting a different second subset of quantization matrices for the subsequent input frame based on encoding information from the initial input frame, the second subset of quantization matrices and the first subset of quantization matrices having at least one quantization matrix not in common, the second subset of quantization matrices from a combination of the set of default quantization matrices and the set of user-defined quantization matrices; and quantizing transform coefficients of the subsequent input frame based on the second subset of quantization matrices.

22. The method of claim 21, including analyzing spatial features of the initial input frame and the subsequent input frame.

23. The method of claim 22, including:

encoding the initial input frame of the video based on the first subset of quantization matrices to determine an encoded frame; and selecting the second subset of quantization matrices based on one or more of an error rate or quality parameter associated with the encoded frame.

24. An apparatus to encode video, the apparatus comprising:

means for accessing an initial input frame and a subsequent input frame of video;

means for encoding a set of user-defined quantization matrices into a sequence header associated with a sequence of video frames including the initial input frame and the subsequent input frame;

means for quantizing input frames, the means for quantizing to quantize the initial input frame using a first subset of quantization matrices from a combination of a set of default quantization matrices and the set of user-defined quantization matrices; and means for selecting quantization matrices, the means for selecting to, after the quantization of the initial input frame, select a different second subset of quantization matrices for the subsequent input frame based on encoding information from the initial input frame, the second subset of quantization matrices and the first subset of quantization matrices having at least one quantization matrix not in common, the second subset of quantization matrices from a combination of the set of default quantization matrices and the set of user-defined quantization matrices, the means for quantizing to quantize transform coefficients of the subsequent input frame based on the second subset of quantization matrices.

25. The apparatus of claim 24, including means for analyzing spatial features of the initial input frame and the subsequent input frame.

* * * * *